United States Patent

[11] 3,623,012

[72] Inventors Denis E. Lowry
Lexington, Ky.;
William L. McDonald, Austin, Tex.

[21] Appl. No. 837,757
[22] Filed June 30, 1969
[45] Patented Nov. 23, 1971
[73] Assignee International Business Machines Corporation
Armonk, N.Y.

[54] ACCOUNTING SYSTEM WITH PROGRAM BY EXAMPLE FACILITIES
4 Claims, 13 Drawing Figs.

[52] U.S. Cl. ........ 340/172.5
[51] Int. Cl. ........ G06f 3/12
[50] Field of Search ........ 340/172.5; 235/157, 156, 61.9

[56] References Cited

UNITED STATES PATENTS

| | | | |
|---|---|---|---|
| 3,043,509 | 7/1962 | Brown et al. | 235/156 |
| 3,112,394 | 11/1963 | Close et al. | 235/61.9 |
| 3,127,504 | 3/1964 | Arnold | 235/61.9 |
| 3,389,379 | 6/1968 | Erickson et al. | 340/172.5 |
| 3,512,137 | 5/1970 | Jones et al. | 340/172.5 |
| 3,512,138 | 5/1970 | May et al. | 340/172.5 |
| 3,525,984 | 8/1970 | Clay et al. | 340/172.5 |
| 3,533,076 | 10/1970 | Perkins et al. | 340/172.5 |

OTHER REFERENCES

Reference Manual— IBM 7080 Data Processing System— A-22-6560-1; 1960- 1961; pp. 6, 7, 9- 19, 25- 28 and 90- 92

General Information Manual— IBM— 720A, 730 Printers, 735 Printer Control, 760 Control and Storage, A22-6768-0, 1955- 1958, pp. 5- 13, 19- 25 and 29- 39

Reference Manual— IBM 7080 Data Processing System— A22-6560-1, 1960- 1961, pp. 82- 90

*Primary Examiner*—Gareth D. Shaw
*Assistant Examiner*—Harvey E. Springborn
*Attorneys*—Hanifin and Jancin and D. Kendall Cooper

ABSTRACT: The accounting system is operator-oriented and includes arithmetic and stored program facilities. The system features entry of program instructions through a "program by example" routine in which the operator enters control (program) information concurrently with the entry of data during conventional typing routines. That is, as the problem is worked, the steps in the operation are stored in program memory. The system is then able to execute the program in a repetitive manner accepting additional keyed-in data, performing calculations, and printing necessary output documents. The system is particularly useful with accounting forms having information arranged in columns. Additional features involve manipulation of column registers, one associated with each column, the branching techniques, decimal point control, determination of true percentages (Percent Equal), use of the Alpha Emit function and the provision of various input and output devices including a magnetic card apparatus.

INVENTORS
DENIS E. LOWRY
WILLIAM L. McDONALD
BY D. Kendall Cooper
ATTORNEY

DECIMAL POINT CONTROL

ACCOUNTING SYSTEM WITH PROGRAM BY EXAMPLE FACILITIES

REFERENCES

U.S. Pat. application, Ser. No. 802,700 filed Sept. 6, 1968; inventor: Robert A. Kolpek; entitled "Data System With Printing, Composing, Communications, And Magnetic Card Processing Facilities," now continuation application Ser. No. 886,798 filed Dec. 19, 1969.

U.S. Pat. application, Ser. No. 765,326 filed Oct. 7, 1968; inventors: Robert A. Rahenkamp and William R. Stewart, Jr.; entitled "Electronic Statistical Typing System."

IBM Customer Engineering Instruction Manual for the "-Selectric*" Printer, Form Number 241-5032-2, dated Jan. 1966 (*Trademark).

IBM Customer Engineering Manual of Instruction for "-Selectric" Input/Output Keyboard Printer, Form Number 241-5159-, dated 1965.

IBM Customer Engineering Universal Reference Manual for "Selectric" Input/Output Keyboard Printer, Form Number 241-5182-, dated June 30, 1963.

BACKGROUND OF INVENTION, INCLUDING FIELD AND PRIOR ART

A number systems have been developed prior to this time that are operable with "program by example" routines. However, none of the prior systems are believed to incorporate the variety of processing and control techniques taught herein. As an example, reference is made to the IBM application "Electronic Statistical Typing System," previously referenced, that is representative of a system of this nature making use of a cathode ray display element and including a stored program that is "learned." The Kolpek application describes a magnetic card recording and reproducing apparatus that is useful in the present system as an input and output device. The "-Selectric" input/output printer manual describes a printer that is modified with an electrical keyboard for use in the present system.

SUMMARY OF INVENTION

The present system is primarily intended for operator control of both data entry and program entry particularly emphasizing a "program by example" feature. The system is responsive to a multitude of instructions for performing a variety of applications requiring calculations and alphanumeric printing. Rather than deriving its program from some automatic input device as with large computer systems, the present system responds to key entries by the operator to enter program information while an accounting job is being done. The operator works the problem in much the same manner as she uses a conventional desk calculator and as the problem is worked, the steps in the operation are stored in the system's program memory. Later, while handling additional groupings of information similarly formulated, the system executes the same program repetitively, accepting keyed-in data in individual data fields across the accounting form, performing calculations, and printing output documents as required.

The primary features of the present inventive arrangements are as follows:

Program By Example

The system responds to key entries to develop a stored program usable in processing information entered at a later time as well as concurrently with the entry of the program.

Columnar Register control (Circle C)

The keyboard includes a Circle C key that enables the operator to access individual columnar registers corresponding to the columns on a form in the printer. The system automatically keeps track of the proper column of the form and the corresponding columnar register.

Branching Technique

The system responds to operator intervention to access individual stored branch routines as required during accounting operations. Depression of one of ten numeric keys on the typewriter accesses a corresponding branch program.

Decimal Point Control

The machine operates with floating point decimal during input and fixed point decimal during output.

True Percentage Operation (Percent Equals key)

Depression of a Percent Equals key by the operator produces an answer in true percentage, that is, one number is a certain percent of another number instead of supplying a particular decimal value.

Alpha Emit

This feature enables the operator to store any of a desired number of repetitive characters in the machine program memory for later use and automatic provision during typing. This is stored information that is used frequently.

Tab Control

In contrast with prior systems, the present system permits the operator to tabulate across unused columns where no entry is required and automatically keeps track of the location on the form as well as the related columnar register.

Auxiliary Input/Output Devices

The system is readily adaptable for use with other input/output devices such as a magnetic card recording and reading apparatus.

OBJECTS

The primary object of the present invention is to provide a system having increased flexibility while retaining operator control with a "program by example" learning routine in order to perform a variety of applications involving arithmetic operations, data input, conversion, data output, printing, and recording and reproducing of information. It is an objective of the present case to provide a powerful system that is useful particularly in connection with accounting forms having columns of information across the form and particularly involving accounting operations such as billing, invoicing (with discounts), payroll, costing, bidding and estimating, purchase order writing, inventory reporting, bill of material explosions, policy writing (insurance), accounts receivable, accounts payable, sales distribution/analysis and similar accounting functions.

The foregoing and other objects, features, and advantages of the invention will be apparent from the following more particular description of the preferred embodiments of the invention as illustrated in the accompanying drawings.

TERMINOLOGY, ABBREVIATIONS, SYMBOLS

Accumulator

Figure 1:
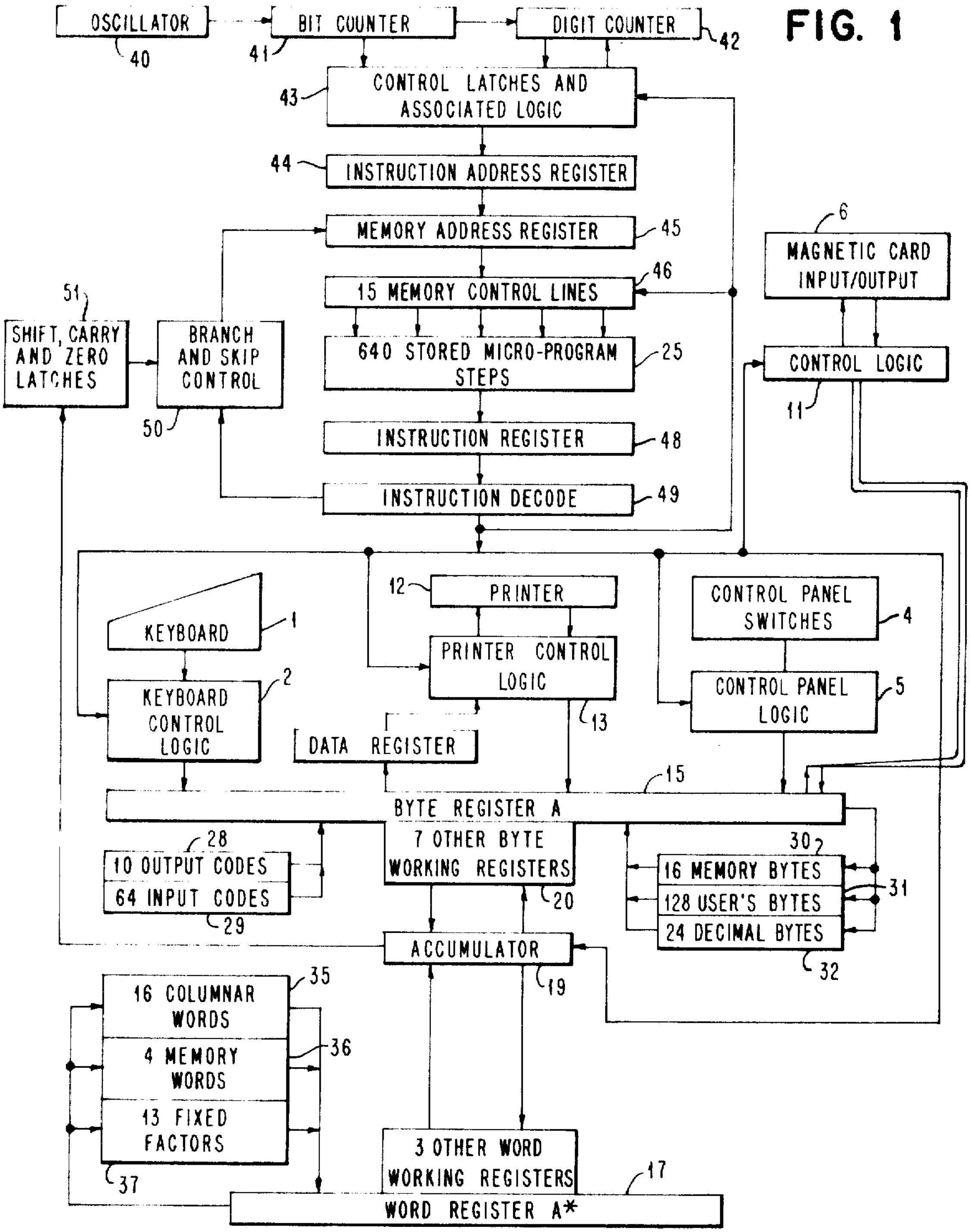
FIG. 1 is a block diagram of an accounting system based on the features previously noted including a keyboard, a printer, memory, arithmetic circuits, associated control, and processing logic.

The Accumulator performs the customary arithmetic function of adding one number (the addend) to another number (the augend) already present in the accumulator to form a sum. In the present system the accumulator is operable in the byte or word mode.

Add

This key causes the contents of the Entry/Result (E/R) register to be added to the contents of the specified accumulator. The I memory is used as the accumulator unless the II, III, or IV memory is specified by a previous keystroke. If this keystroke follows a numeric entry, the entry is printed but the result of the accumulation is not. The contents of the E/R register remains unchanged.

Alphabetic Keys

If the calculator is in the Alphabetic Entry or in Type mode, the keyboard can be used as a standard correspondence keyboard with both upper and lowercase characters and all typing functions available.

Alpha Emit

This key has the same function as Alpha Entry except that in the Program mode, all keys struck after this key and before the Program Start key are captured in memory and will be emitted from memory when the program is executed.

Alpha Entry

This key returns the keyboard to its normal typing condition. Any of the normal typing functions are allowed in this condition. To return to the calculate modes, the Program Start key is struck.

Arithmetic Unit

The arithmetic unit contains logic circuits, storage registers for programs and data, and controls for the associated input and output devices. The arithmetic unit coordinates and controls the input of data, the arithmetic operations of such data, and the printing of the output documents.

Auto Mode

In this mode, functions are executed according to a stored program.

Bit Counter

Counts 1–6 representing the 6 bits in a byte.

Branch and Skip Control

Recognizes conditions for a branch operation and initiates necessary control to perform the branch as well as skip intermediate program steps.

Branch Keys

Ten keys are used to indicate branching addresses in program memory. These are the ten numeric keys 0–9 in the top row of the keyboard. These keys are struck to cause the changing of subroutines.

Byte Register A

Primary interface with input/output devices. It has a capacity of six bits, comprising one complete byte of information.

Byte Working Registers

There are seven additional byte working registers for storing bytes of information for transfer into and out of Byte Register A during various arithmetic or other operations.

Carry Latch

Stores an indication that a carry has occurred during arithmetic operations.

Control Latches and Control Logic

There are a number of control latches that determine the system operation. As an example, the system performs its functions during three basic cycles: Reset, Access, and Execute. During Reset time, control latches are reset from the previous operation. During Access time the next instruction is obtained, stored in the machine. During Execute time the operation required by the instruction is performed. During the cycling of the system, the next instruction is brought into instruction address register 44 which controls the memory address register 45 to access the actual instruction from the microprogram section 25 into instruction register 48 whereupon the instruction is decoded in block 49. Contrary to the data bytes and words, an instruction in location 25 is 12 bits long. Up to four bits are used for the operation or "Op" code and the other positions serve as modifiers of the code. Reference is made to a later section for an indication of the various instructions that are encountered in the system. Basically, the various instructions are divided into five major groups that are referred to as branch, fetch and store, byte arithmetic, word arithmetic, and skip.

Columnar (C) Accumulation

This key is used to address 16 numeric registers. The use of this key is the same as the use of the I, II, III and IV keys except that each time C is struck, it steps the C address counter to the next address. For example, C + will add the E/R register to the presently addressed C register and then steps the C address counter to the next address. A Carrier Return resets the C address counter.

Columnar Words (Registers)

There are sixteen (16) columnar words that are total registers for 16 corresponding columns across any particular form that is in use in the printer. These are accessed sequentially by depression of the Circle C key on the keyboard.

Data Register

A 6-bit register through which all printer data flows.

Decimal Bytes

These twenty-four (24) bytes correspond to 24 words of information that are in the word operating area of the system diagram.

Decimal Point Control

This section controls processing of input decimal factors from an input media such as a magnetic card, or from the keyboard. Also output decimal and calculation significance is controlled by appropriate programming. Both input and output decimal control is selected by rotary switches shown in FIG. 1*a*, but input control can be operator modified.

Decimal Selector

Figure 1A:
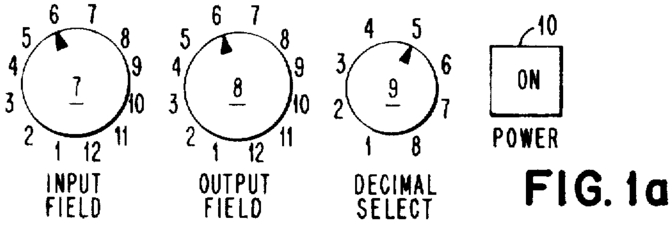
FIG. 1*a* illustrated a form of control panel useful in setting up the system of FIG. 1.

This multiposition switch, FIG. 1*a*, selects the number of digits to the right of the decimal point to be used in all output printing.

Digit Counter

The Digit Counter cooperates with the bit counter to count up to 42 bits, comprising a word of information.

Divide

This key causes the contents of the E/R register to move to the OP register and conditions a divide. Otherwise, its operation is identical to multiply.

Electronic Logic

All circuits for I/O control, for program storage and execution, and for arithmetic functions are located within the arithmetic unit. In addition, some of the controls necessary for use of the Magnetic Card device are within the arithmetic unit.

Equals

This key causes a preconditioned multiply or divide to be performed. The OP register is multiplied or divided by the E/R register and the result appears in the E/R register. The result prints after the operation is completed.

Equals Accumulate

The operation of this key is the same as the Equals key except that in addition the result is added to the I memory word.

Field Width Selector Switches

These two multiposition switches (one for entry printing and one for result printing) select the desired field widths to be used throughout the program for printing control.

Fixed Factors

The system includes thirteen (13) fixed factors that are used in converting binary numbers to a binary coded decimal representation for printout purposes.

Function Decode

System circuits responsive to functional indications to derive an appropriate functional control signal.

Function Keys

Figure 2:
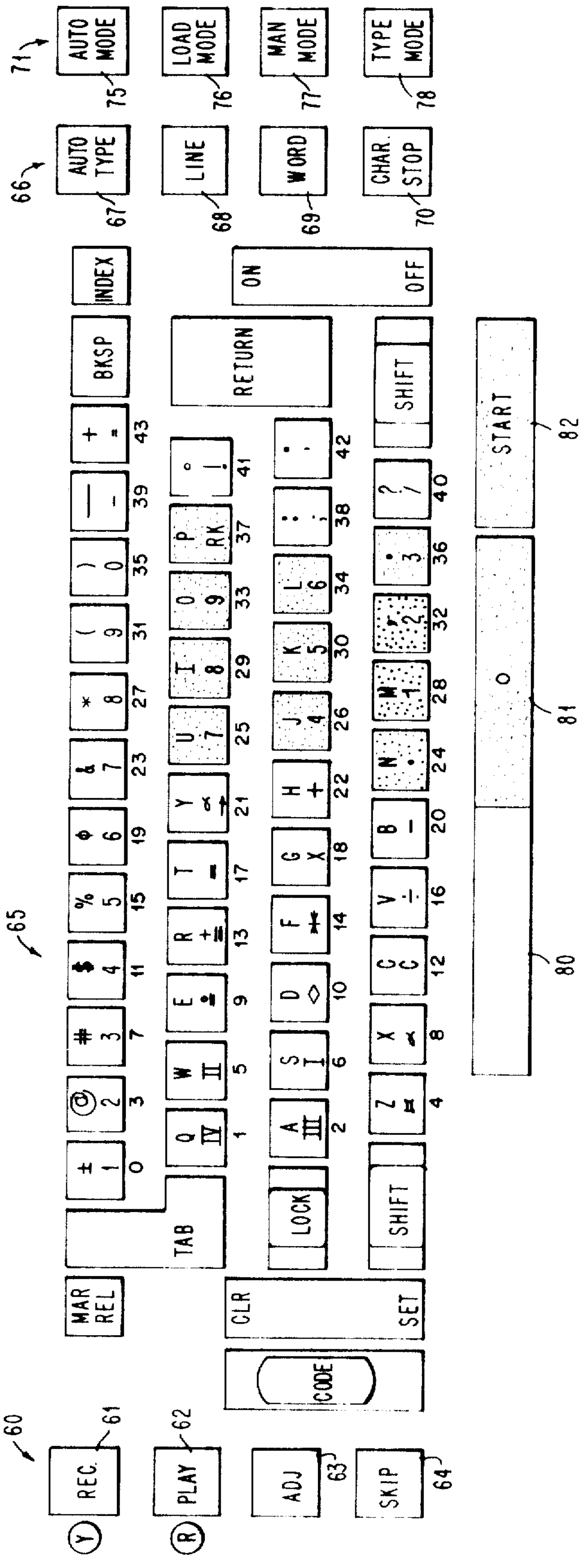
FIG. 2 is a suggested arrangement for the keyboard in the system of FIG. 1.

Seventeen keys are used as function keys for arithmetic operations. These keys are shown in FIG. 2 and are defined as follows:

I—The Primary accumulator
II—A Secondary accumulator
III—A Secondary accumulator
IV—A Secondary accumulator ◇—The Sub-total function
α—The Alpha Entry function
▭—The Non-print function
≑—The Percent Equals function
C—The Columnar accumulate function (Circle C)
± —The Equals accumulate function
÷—The Divide function
=—The Equals function
*—The Total function
×—The Multiply function
−—The Subtract function (Negative entry)
+—The Add function
α→—The Alpha Emit function Input Codes
The system responds to sixty-four (64) input codes from the keyboard representing rotate and tilt positions of the print head in the printer and converts these to a character set that is usable internally in the system.
Instruction Address Register (IAR)
Contains address of next instruction required during operations.
Instruction Decode
Recognizes the individual instructions and develops signals to initiate the required operation.
Instruction Register
Retains instructions during use to control the operation required in the system.
Instruction Set
The system responds to instruction words as follows:
Branch Unconditionally Without Link (BU)
Branch Unconditionally Using LAR (BU LAR)
Branch And Link (BL)
Byte Arithmetic (8 instructions)
Add Byte (AB)
Add Byte—Clear Q (ABQ)
Subtract Byte (SB)
Subtract Byte—Clear Q (SBQ)
Copy Byte Positive (CB+)
Copy Byte Negative (CB−)
Transfer Byte Positive (TB+)
Transfer Byte Negative (TB−)
Word Arithmetic (11 instructions)
Add Word (AW)
Subtract Word (SW)
Copy Word Positive (CW+)
Copy Word Negative (CW−)
Transfer Word Positive (TW+)
Transfer Word Negative (TW−)
Add Word Clear Q (AWQ)
Subtract Work Clear Q (SWQ)
Add Word And Shift (AWSH)
Subtract Word And Shift (SWSH)
P Word Shift (PWSH)
Skip Conditionally
Fetch Or Store (7 instructions)
Fetch or Store Word (Indirect) (FW, STW)
Fetch Or Store Decimal Bytes (Indirect) (FD, STD)
Fetch Or Store Input Codes (Indirect) (FC, STC)
Fetch Or Store Users Bytes (Indirect) (FU, STU)
Fetch Or Store Bytes (Direct) (FB, STB)
Fetch Immediate (FIM)
Fetch Or Store I/O (FIO, STIO)
Keyboard
The system uses an electric keyboard for manual data input and for programming. The keyboard has overlayed function keys, Program Start bar and an integrated 10-key unit, in addition to its standard typing features. The keyboard is used not only for standard typing, but also for numeric entry, for programming, and for program control. The output of the keyboard is a seven-bit code from reed switches for all characters and functions.
Keyboard Control Logic
Circuitry responsive to key depressions to develop a corresponding signal representation.
Key Description There are four groups of keys on the alpha-numeric keyboard that are used to program the calculator or enable it to execute its functions. These are Function Keys, Numeric Entry Keys, Branch Keys, and Alphabetic Keys.
Load Mode
This mode performs the same as the Manual mode, but also stores the program characters as they are struck.
Magnetic Card Device
The system is designed to used magnetic cards as input and output media as derived from apparatus like that in the Kolpek case. When the magnetic card device (Magnetic Card "-Selectric" Typewriter-MC/ST) is used in conjunction with the arithmetic unit, the system has full MC/ST) is used in conjunction with the arithmetic unit, the system has full MC/ST capabilities as well as the usual calculating functions. The system has the ability to use the magnetic cards for storage of alphabetic or numeric data and programs. The arithmetic unit is designed for use with a single-station MC/ST. The MC/ST is used in conjunction with the arithmetic unit for the following functions:

Alphabetic Printing

To use the MC/ST to print alphabetic data, the following sequence of keys is struck. First, Alpha (α) is struck indicating that the data is alphabetic. Play is struck indicating that the data is not to be recorded. Second, Char, Word, or Auto is struck indicating that the data is to come from the magnetic card. If a third key is not struck, the keyboard is unlocked for standard manual typing. If the Record key is struck instead of Play, then the alphabetic data typed manually will also be recorded. In Auto Mode, the functional characters would be emitted in the same order to cause the proper function.

Numeric Entry and Output

The striking of the Play key, then the Word key when the calculator is in a numeric entry mode will cause a word of numeric data to read into the calculator and then be printed. To record fields, the MC/ST is put into the Record mode by striking Record prior to causing the desired field to print. The MC/ST is then returned to the Play mode to prevent further recording.

Program Storage

The MC/ST card is also used for program storage. The series of functions and entries which is captured during the programming of the calculator may be written on the MC in a program-out mode. Also, characters stored on an MC may be read into the program memory in the program-in mode. The program cards may also be made on a nonarithmetic MC/ST and they may have a special format to identify them as program cards.
Manual Mode
In this mode, the arithmetic unit performs as a manual calculator with functions performed as they are keyed.
Memory Address Keys—I, II, III, IV
These keys specify memory is to be used with the Add, Subtract, Total, or Subtotal functions that follows. If no key is specified, I memory is assumed. In addition, these keys can be used to specify which memory to use instead of the E/R register in a Multiply, Divide, or Equals operation. In other words, II + will add E/R into II, and II × III = will multiply memory II times memory III.
Memory Address Register
Contains the address of information in the memory for controlling memory drive lines.
Memory Bytes
The system has sixteen (16) memory bytes that are used as markers for program control and auxiliary address registers.
Memory Control Lines
Drive lines responsive to the current address in the Memory Address Register to access a particular section of memory.
Memory Words Four (4) memory words serve as auxiliary registers and are addressable from the keyboard. These are the Entry/Result (E/R); A*; Multiplicand (MP) and Operand )Op) registers.

Multiply

This key causes the contents of the E/R register to move to the OP register and conditions a Multiply operation. The contents of the E/R register remains unchanged. If this keystroke follows a numeric entry, that entry will print but no other print will occur.

Nonprint

This key followed directly by a function key inhibits the normal printing associated with that function.

Numeric Entry Keys

Twelve keys and the Program Start bar are used to provide numeric field entry during the loading of programs and during manual or automatic execution of an operational sequence of functions. These keys are shown in the shaded key areas of FIG. 2. Ten of the keys are arranged in a standard 10-key format for ease of use in numeric entries. These characters are the 0–9 numeric keys. One key (Rekey) is used to condition the entry register to zero to accept a new entry—in most cases, a corrective entry. The 12th key (Decimal) is used to indicate the decimalpoint position in the entry. If this key is struck during entry, it marks the position of the decimal in the entry. The Program Start key (Start) is used to signify the end of an entry. For negative entries, the Subtract key is struck during the entry in Auto mode. This section of the keyboard is operational anytime the machine is in the calculate modes and not completing a functional operation. The decimal point system used is floating point in entry and calculations and fixed point on result print out. There are two types of numeric entry. Nondecimal where no decimal point key was struck during programming, and decimal (D) where the decimal point key was struck during programming. Entries will print out with the decimal point keyed if in Auto or Manual mode. If no decimal point is keyed, the entry is assumed integer. In Auto mode, no decimal point (if D) or the decimal selector switch position (if D) will be used unless a decimal point is keyed during the entry. The printout of a result of a machine calculation has its decimal point location controlled by the decimal selector switch on the control panel, and the result is half-rounded to the selected number of decimal places. In Auto mode, there are two methods of skipping programmed numeric entries. One is to strike the Program Start key without striking a numeric key. In this case, the machine will clear the E/R register and print out spaces or zeros according to the programmed entry decimal format, then continue executing functions normally. The second method is to strike the Tab key. This will cause the printer to tab once and cause the calculator to skip all programmed functions except multiple Tabs or a Carrier Return until the next entry function appears.

Output Codes

The system develops ten (10) output codes corresponding to rotate and tilt locations on the print head in the printer in order to specify numbers for printing.

Oscillator

Provides basic timing pulses for the system.

Percent Equals

This key operation is the same as the Equals key except that the result is divided by 100 before the operation is complete. During multiplication this allows the calculation of whole percentages (100.00×3.5%≐3.50) to be performed. During division, this causes the result of the division to be expressed in percent (24100≐24%).

Printer

The printer is modeled after the IBM Input/Output "Selectric," but is actuated electrically. The printer is used in conjunction with the arithmetic unit for the preparation of bills, invoices, orders, etc. The printer can also be used independently of the arithmetic unit as a conventional correspondence typewriter with all the necessary typing functions available.

Printer Control Logic

Responds to various signals to and from the printer to derive appropriate control levels.

Program Address Word (PAW) Counter

An internal counter that keeps track of which of 128 User's bytes is being worked on. It is stepped when the next character is brought out.

Program by Example

Refers to the loading of a program from the keyboard under operator control concurrently with the entry of data, with the program thereby being available for use in subsequent entry and output routines.

Program Memory

The program memory has 128 (6 bits) bytes dividable into ten subroutine areas. Programs are changeable one subroutine at a time. All program steps typed from the keyboard during Load Program mode will be stored in the selected subroutine of program memory.

Program Step Counter

Controls the cycling of the system through various routines including the printing of characters.

Programming

The calculator obtains its program through the alphanumeric keyboard, and the program set consists of a series of alphanumeric characters. Each character is complete within itself, and it is only the sequence of characters that can change the desired operation of the machine.

Shift Latch

Supplies indication of shift status of printer.

Stored Micro Program

The system is capable of storing six hundred forty (640) microprogram steps that are accessed during operations.

Subtotal

This key operation is the same as Total only no clear occurs.

Subtract

This key causes the contents of the E/R register to be subtracted from the contents of the specified accumulator. Otherwise, its operation is identical to Add.

Tab And Carrier Return Operation

The Tab and Carrier Return keys are also used as programming keys. In the Load mode, both keys are stored as program characters. The Tab character has only its normal meaning when struck in the Load or Manual mode or when emitted during the execution of a program in Auto mode. The Carrier Return character has an extended meaning when struck. When the Carrier Return character is struck or emitted, it performs its normal function of returning the print head but in addition, the character causes a reset of the calculator by branching to the first step of the program and resetting the columnar accumulator address counter. Each subroutine within a program must end in a Carrier Return. The striking of the branch keys causes a search and count of the Carrier Returns stored in memory till the proper number of Carrier Returns is counted.

Total

This key causes the contents of the specified accumulator to transfer to the E/R register and print. The specified accumulator is cleared.

Type (MC/ST) Mode

In this mode, the keyboard is joined directly to the printer for use as a standard "Selectric" typewriter. If a magnetic card device is present, this mode enables all of the MC/ST functions.

User's Bytes

There are one hundred twenty-eight (128) User's Bytes for storing a program by example for use in the system.

Word Working Registers

The system has three (3) Word Working Registers besides Word Register A* for temporary storage of data during processing. All internal arithmetic operations are performed among these four registers.

Word Register A*

Word Register A* has a capacity of forty-two (42) bits of information. This register serves to fetch and store columnar words, memory words, and the fixed factors during processing.

Zero Latch

This latch checks bytes of information for the presence of zeros. It is used for example to determine Type mode which is all zeros or to indicate the presence of a "one" bit in information, to check the result of an addition to see if the sum is zero, or to check for a zero condition during a transfer operation.

System Organization, Description, and Data Flow

FIG. 1 is a block diagram of the present system including various input and output devices, a central memory, clock circuits, working registers of various kinds, an accumulator, and associated control logic.

The particular features herein include the following:

1. Program By Example
2. Handling of Column Registers (Circle C)
3. Branching Technique
4. Decimal Point Control
5. Percent Equals Operation
6. Alpha Emit
7. Tab Control
8. Magnetic Card Extensions The features listed directly above have been previously alluded to in the introductory section of the present case and will be developed in greater detail in connection with a sample accounting application to be discussed shortly.

For the present, attention is directed to the system diagram of FIG. 1. The various components of the system are generally defined in the terminology section above, to which reference is made. However, a discussion of the interconnection of the components in the system and their interaction is considered useful. Input to the system is through the keyboard 1 and associated control logic 2 as well as control panel switches 4 and associated logic 5. The control panel switches are shown in greater detail in FIG. 1*a* and include switch 7 for selecting input field width, switch 8 for selecting output field width, switch 9 for selecting the decimal point location and the usual power-on switch 10. Output from the system is by printer 12 from control logic 13. Printer 12 is comparable to the "Selectric" printers described in the manuals previously referenced. Considering the logic blocks 2, 5, and 13, keyboard logic 2 controls cycling of the system responsive to depression of keys on keyboard 1. Control panel logic 5 gates the settings of the different switches 7, 8, etc., into the common interface which is the byte register A, designated 15. Printer logic 13 controls movement of data to the printer and feed back from the printer and its timing.

An auxiliary magnetic card unit 6, such as that disclosed in the Kolpek case, serves as additional input/output through control logic 11.

All data derived from the input/output devices occurs by a sampling technique during which characters are deposited in register 15. This register is six bits long. Entries from keyboard 1 enter register 15 in the six bit keyboard code as a result of closure of electrical switches in the keyboard. Characters to be printed are directed to printer 12 from register 15 and have bits representative of rotate and tilt conditions on the print head on printer 12. On the other hand, information from control panel switches 4 may be six bits of a pure binary code. So all of the contact with the input/output devices is through byte register A. Another register of interest is Word Register A* designated 17 in the lower portion of FIG. 1. Information in the system is handled on either a byte basis or a word basis with an individual byte comprising 6 bits of information and a word comprising 7 bytes or 42 bits of information. Closely associated with the registers 15 and 17 is accumulator 19 serving to perform the usual arithmetic functions in the system.

Figure 3:
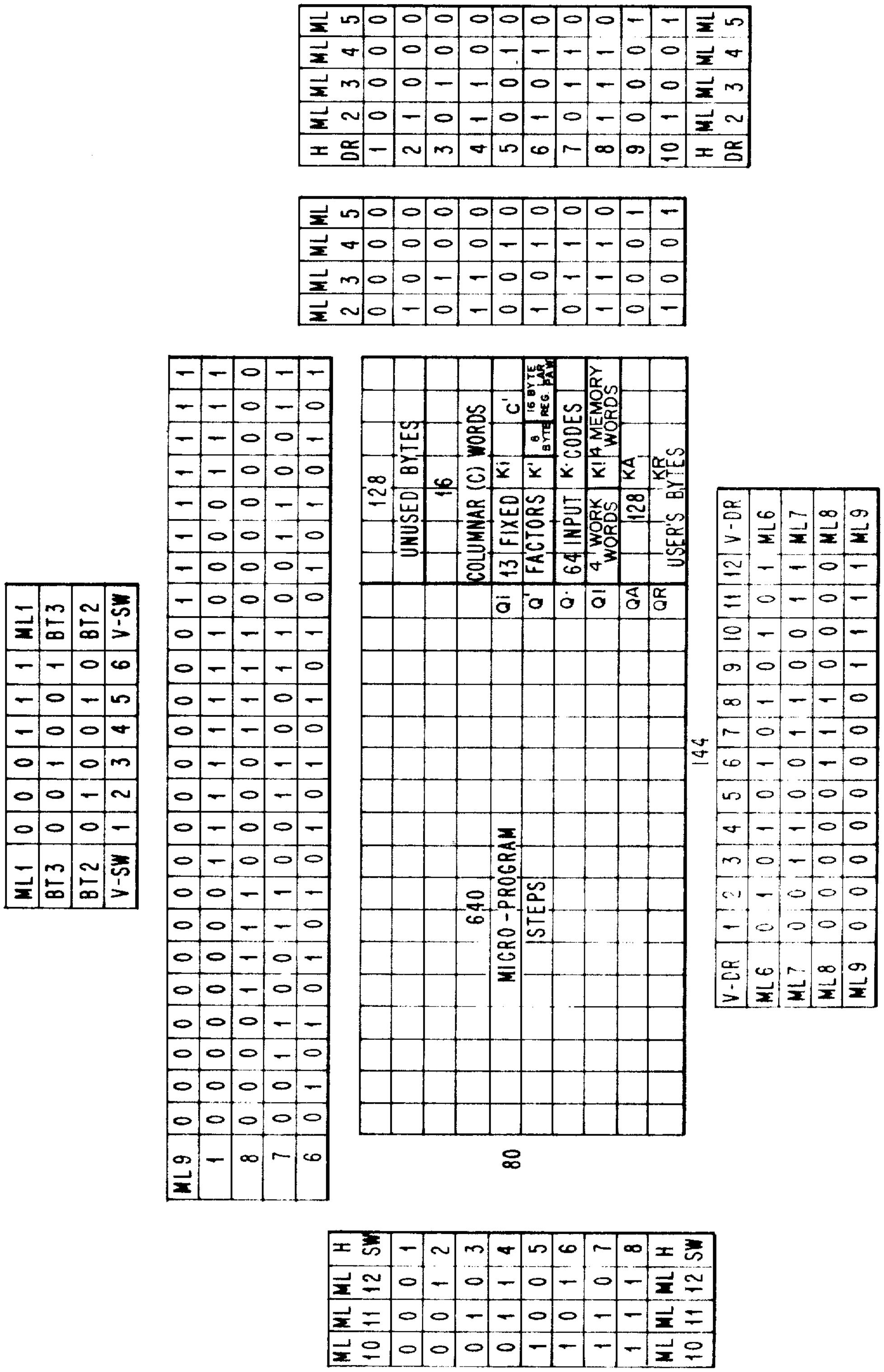
FIG. 3 illustrates the arrangement of the memory in FIG. 1 including the microprogram steps and various register areas.

Besides Byte Register A, seven other byte working registers are provided indicated at 20. These serve to store individual bytes of information during processing. These may also be seen in FIG. 3 which illustrates a memory configuration that includes a left-hand portion storing six hundred forty (640) microprogram steps and a right-hand portion for storing various bytes and words of information as well as codes used for translation purposes. The microprogram portion of the memory in FIG. 3 is designated 25 in FIG. 1. The other portions of the memory are scattered throughout FIG. 1, but include those associated with Byte Register A, that is, 10 output codes and 64 input codes at 28 and 29, respectively; 16 memory bytes, 128 User's bytes, and 24 decimal bytes designated at 30, 31, and 32, respectively. Associated with Word Register A* are 16 columnar words, 4 memory words, and 13 fixed factors, designated 35, 36, and 37.

Basic timing for the system from oscillator 40 driving bit counter 41 and digit counter 42. Bit counter 41 counts 1–6 and digit counter 42 counts 1–7, the two counters combining to define a word of 7 bytes or 42 bits of information. Associated with the counters and other logic are control latches 43, an instruction address register 44, and memory address register 45, 15 memory control lines 46 concerned with accessing the microprogram in block 25, an instruction register 48, an instruction decode section 49, other logic concerned with branch and skipping designated 50, and shift, carry, and zero conditions designated 51.

The system operates basically on individual cycles involving three subcycles, that is, a Reset subcycle, an Access subcycle, and an Execute subcycle. During the Reset portion of the cycle, all control latches are reset from a previous operation. During Access time, the next instruction is accessed from memory, stored in the machine, and during Execute time the particular operation required by the instruction is performed. The system then recycles and goes through similar succeeding cycles.

To further clarify some of the system aspects, the byte arithmetic operations will involve factors found in the working registers 20 that are transferred to Byte register A during actual arithmetic operations. The other byte locations 30, 31, and 32 store information that is useful during processing of data but that is transferred into Byte register A to determine its significance. When coming from keyboard 1 into the system, the switch closures effected by depression of the keys on the keyboard (the keys being shown in greater detail in FIG. 2) are translated to individual related input codes by reference to the input code section 29. Upon output from the system to the printer, data that is stored, as an example, in binary is converted to a proper rotate-tilt configuration for printing of a decimal representation 0–9 by reference to the output code section 28. The 16 memory bytes 30 are used in the system as marker bytes for program control and as auxiliary address storage. The 128 user's bytes 31 are available to store a program entered through keyboard 1 during a Load Mode to be discussed later. The 24 decimal bytes correspond to 24 words of information in the word area. The decimals are handled on a byte basis, while the data in those words are handled on a word basis. So far as the actual arithmetic operations are involved, the data is accessed from memory on a byte or word basis, but processed on a serial by bit basis.

Considering the relationship of Byte Register A and Word Register A*, some interaction occurs. As an example to perform an entry of a particular arithmetic value, the operator depresses keys on the keyboard 1, one key at a time to enter a number. Each digit as it is entered, appears in the "Selectric" code, but is converted internally by the arithmetics to a binary representation that is assembled in Word Register A*. This continues with the entire number eventually being assembled in Word Register A* for later use. On the way out to the printer during output operations, 13 fixed factors in section 37 are accessed to convert the binary representation of numbers to the proper binary coded decimal representation for printout purposes. The four memory words in section 36 are available as auxiliary registers for use by the operator to enter information of a "repetitive" nature, such as a date or standard terminology, or the like for use on each form during an accounting operation.

The 16 columnar words in section 35 are essentially total registers corresponding to up to 16 columns across a form in use in the system on printer 12. These are addressed by depression of the Circle C (columnar) key. As individual columns on the form are encountered, the appropriate corresponding columnar words are accessed so that a running total may be kept for each of the columns on the form. Later, it is possible to read out and print any total stored in the columnar registers. There is actually only one columnar key on keyboard 1 shown in greater detail in FIG. 2. Each time it is depressed, circuits are stepped in the system to access and appropriately address the next higher columnar register. As will come out further in the description, the system automatically keeps track of the columnar register, even though they may be skipped as, for example, during tabulation operations.

Keyboard

Reference is now made to FIG. 2 that illustrates the configuration of various keys provided on keyboard 1 in FIG. 1. The keyboard essentially comprises a leftmost section 60 including Record button 61, Playback button 62, Adjust button 63, and Skip button 64 that are primarily concerned with the magnetic card recording/reproducing unit when connected in the system as an auxiliary input/output device and as particularly described in the Kolpek application referred to in the "Reference" section. The central portion of the keyboard designated 65 includes a variety of keys, many of which correspond to those customarily encountered on the "Selectric" printer, but in the present system the key button designations have been modified to suit the particular entry and output functions of the system. Accordingly, under some circumstances, a particular key will represent a conventional character such as, for example, the "T" key, and under other circumstances represent a particular function as, for example, on the same key, the Equals function, "=." Section 66 includes a number of mode keys, such as the Auto-Type key 67 and information selection keys 68, 69, and 70 for selecting lines, words, and characters of information, primarily for use with the MC/ST extensions. The rightmost section of the keyboard in FIG. 1 designated 71 includes mode buttons 75–78 referred to as the Auto mode, Load mode, Manual mode, and Type mode, the purpose of which will be developed shortly.

As a preliminary indication of the functions in the system, depression of Type mode button 78 established interconnections of the keyboard with the system so that the input from the keyboard serves primarily to operate the printer with data entering the system and directly back to the printer somewhat in the manner of a conventional type-writing machine. The main difference is that the data enters the electronics of the system as an intermediate step between its entry and output to the printer.

When Manual mode button 77 is depressed, the logic is established for a manual calculate mode wherein the striking of certain "function" keys on the keyboard will cause the functions to be performed arithmetically and also data is entered by means of the shaded portion of the keyboard that is overlayed on the standard keyboard. There is no storage of a program in this mode. The system works in a sense somewhat like the conventional desk calculator in this mode.

In a Load mode, established by depressing keybutton 76, the system actually receives information from the keyboard in a "learn" mode and stores it in the 128 user's bytes portion of the memory in the system. The system will operate similarly to the Manual calculate mode established by keybutton 77 except that the functions encountered during operation are stored in the memory for later use.

Such later use occurs during the Auto mode established by depressing keybutton 75. In this mode, a previously stored user's program is accessed along with related microprogram steps stored in the memory to execute the required operations.

Portion 65 of the keyboard in FIG. 2 includes a modified space bar 80, part of its space accommodating the "0" key used during numeric entry and designated 81. Further to the right is Start key 82 for initiating an entry into the system from the shaded portion of the keyboard. During entry of numeric information by means of the shaded numeric keyboard portion, no printing of the individual digits of a number occurs until the Start button is depressed whereupon the entire number is printed out for checking purposes.

Some of the other keybuttons in portion 65, FIG. 2, are of interest, but reference is particularly made to the "Terminology" section for detailed definitions of these keybuttons. Besides the numeric keys 0–9, the shaded portion also includes a Decimal Point key and a Rekey for correction of input before printing. Over in the unshaded areas of keyboard portion 65 are four keys carrying roman numerals I–IV corresponding to the four word working registers in section 36, FIG. 1. There are three keys involving "Equals" operations that include the Equals Percent, Equal Accumulate, and Equals alone. These are the E, R, and T keys. The Equals Percent key is useful in multiplication or division for modifying a numeric quantity by a factor of 100 to change it to a percentage value. The Equals Accumulate key initiates performance of a multiplication or division and accumulates it in the primary accumulation Register I. The plain Equals keybutton essentially initiates the completion of a multiplication or division operation. On the G and V keys are a multiply and a divide indication, respectively. Corresponding functions are stored or initiated when these keys are depressed. On the F key is a symbol resembling an asterisk that indicates a total operation and which tells the system to print out the total in a particular register. This prints out and clears the register. The diamond on the same key as the letter D initiates a subtotal operation. Besides the foregoing, other keys of interest are the Add and Subtract keys and the Non-Print keys associated with characters H, B, and Z. The Alpha key on the same keybutton as the character X converts the typewriter keyboard back into a conventional Alphanumeric mode for the typing of names, notes, or various kinds of data just as with a conventional typewriter. The Circle C key on the keybutton with the letter "C" controls the columnar addressing of the system with the various columnar words in section 35, FIG. 1, being accessed in a successive manner each time this key is depressed. The Alpha Emit key on the button with "Y" allows the storage of any of the alphabetic characters from the keyboard without a corresponding function being indicated. Thus, if the operator wishes to have a word such as "TOTAL" printed out automatically during the course of a program, the storage of the characters is done under control of the Alpha Emit key. At the top of the keyboard is a row of keys 1–0 that are used by the operator for branching purposes and that respectively designate subroutines 1–0 in the user's byte portion of the memory. During a Load Mode, such keys can be used to designate the subroutines while they are being loaded. Later, during an Auto mode, these keys are depressed to access desired subroutines.

Ordinarily, when the keys are used for both printing of characters and printing of program symbols, a special "program" print head is provided on printer 12 in FIG. 1. Otherwise, the depression of the keys will effect the printing of upper and lower case characters somewhat in a normal fashion.

Memory Organization

The system memory was previously referred to briefly in connection with the block diagram of FIG. 1, but is particularly shown in FIG. 3. Two-thirds of the memory is occupied by 640 microprogram instructions, each having a 12-bit length. Considering the rightmost one-third of the memory, the upper portion is set aside for future expansion. Next, the 16 columnar (C) words are encountered. The memory then has 13 fixed factors and a number of byte locations previously noted in connection with sections 30, 31, and 32 in FIG. 2. These include the 8 working bytes, and 16 other bytes of storage. There are twelve marker bits, the link address register (LAR) and the program address word (PAW). Below that is a section for storing the 64 input codes, four working words and four memory words. And finally the memory contains the 128 user's bytes locations.

Typical Accounting Application

For purposes of illustrating the present inventive arrangements, a description of a typical job or application in an accounting environment follows.

The primary features that are illustrated by the typical application are Program By Example, Control of Columnar Registers, Branching Procedures, Decimal Point Control, Percent Equals Operation, Alpha Emit, Tabulation Control, and Magnetic Card Extensions.

The typical accounting job involves the preparation of a form on printer 12, FIG. 1, that is arranged with a number of significant columns of information. The form appears as follows:

The first group of names and related information is somewhat straight forward, but is intended to illustrate the entry of the program for controlling printing of each of the lines to be discussed shortly. The second group of names illustrates the skipping of columns and the recognition of tabulation operations, meanwhile maintaining synchronism between the physical location on the form and the actual columnar register accessed in the system. The third group of names illustrates the handling of different rates having decimal point locations that are in different places.

Program By Example

One of the primary features of the present system is the "learning" procedure involving a program by example. This means that the machine adapts itself to a program that is entered by the operator either separately from or concurrently with the entry of related data. The program is physically coordinated with the various columns encountered on the form and stored in the user's byte area of the memory of the system.

| Name | First month | Second month | Third month | Quarter | Rate | Quarter total | Previous total | Diff. | Percent diff. |
|---|---|---|---|---|---|---|---|---|---|
| First | 1.00 | 2.00 | 3.00 | 6.00 | 4.00 | 24.00 | 23.00 | 1.00 | 4.35 |
| Second | 2.00 | 3.00 | 4.00 | 9.00 | 8.00 | 72.00 | 71.00 | 1.00 | 1.41 |
| Third | 3.00 | 4.00 | 5.00 | 12.00 | 6.00 | 72.00 | 69.00 | 3.00 | 4.35 |
| Total | 6.00 | 9.00 | 12.00 | 27.00 | .......... | 168.00 | 163.00 | 5.00 | 3.07 |
| First | 1.00 | .......... | 3.00 | 4.00 | 4.00 | 16.00 | 15.00 | 1.00 | 6.67 |
| Second | 2.00 | 2.00 | 1.23 | 5.23 | 1.23 | 6.43 | 6.00 | .43 | 7.17 |
| Third | .......... | 4.56 | 7.89 | 12.45 | 3.21 | 39.96 | 32.00 | 7.96 | 24.88 |
| Total | 3.00 | 6.56 | 12.12 | 21.68 | .......... | 62.39 | 53.00 | 9.39 | 17.72 |
| First | 1.23 | 4.56 | 7.89 | 13.68 | 3.3333 | 45.60 | 45.33 | .27 | .60 |
| Second | 9.87 | 6.54 | 3.21 | 19.62 | 2.15 | 42.18 | 41.23 | .95 | 2.30 |
| Third | 1.23 | 7.89 | 4.56 | 13.68 | 1.2 | 16.42 | 15.00 | 1.42 | 9.47 |
| Total | 12.33 | 18.99 | 15.66 | 46.98 | .......... | 104.20 | 101.56 | 2.64 | 2.60 |

General Description of Form

The exemplary form has a number of columns arranged from left to right and designated Name, First Month, Second Month, Third Month, Quarter, Rate, Quarter Total, Previous Total, Difference, Percent Difference. It is assumed that the form represents a quarterly summary of some company activity. As an example, the form could be based on operations of an oil company involving the listing of tank car operations, as an example, gallons carried, the rate charged for cartage, etc. Or it could represent the names of employees, the number of hours worked, the rate per hour, total hours for the quarter, rate for the quarter, etc. The form includes three sections arranged vertically, each section having first, second, and third names and a running total for each of the vertical columns. This is done during a Load operation. During Loading, the operator may make use of actual data in the first line, simulated data, or data used during a previous quarter, as an example. In any case, the various functional characters representing program requirements are entered into memory for later access. That is, the operator needs to enter the program only once for any particular form and thereafter it is accessed as required in processing data that is subsequently entered.

Two kinds of programs are required for the form previously illustrated. These are the "Line" program and the "Total" program. The two kinds of programs are illustrated in the following material which relates the programs to the particular columns on the form previously illustrated and also summarizes what is involved in the entry procedures.

First Line Data And Program Entry

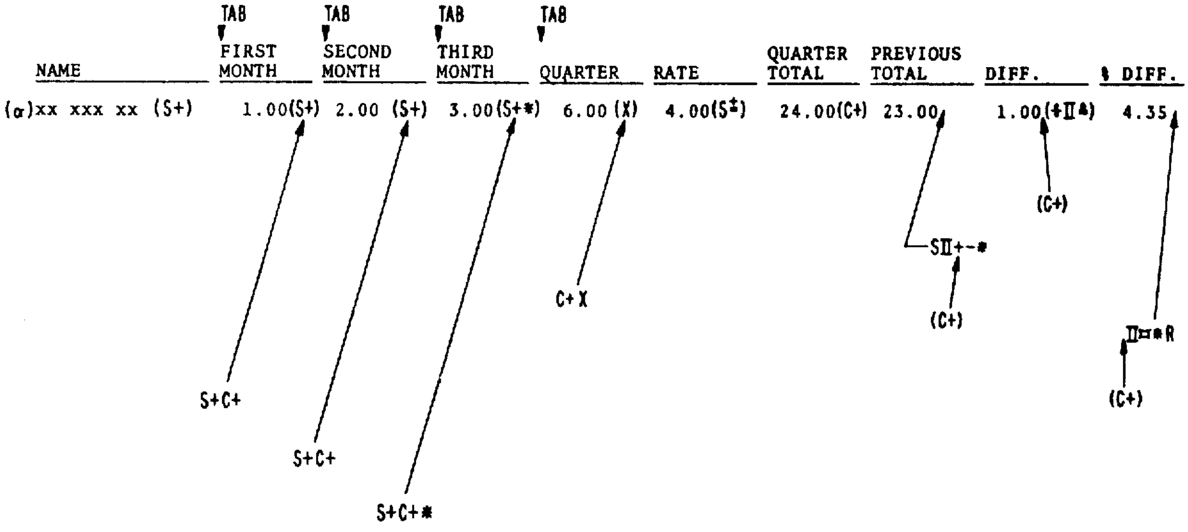

LINE PROGRAM

| | | |
|---|---|---|
| | α | =Start alpha entry. |
| | S | =End alpha entry. |
| | Tab | =Tab (to beginning of first numeric field). |
| 1.00 | | =Enter first number. |
| | + | =Add first number to accumulator (I=1.00). |
| | C | =Address first columnar register. |
| | + | =Add first number to first columnar register. |
| 2.00 | S | =Enter second number. |
| | + | =Add second number to accumulator (I=1.00+2.00). |
| | C | =Address second columnar register. |
| | + | =Add second number to second columnar register. |
| 3.00 | S | =Enter third number. |
| | + | =Add third number to accumulator (I=3.00+2.00+1.00). |
| | C | =Address third columnar register. |
| | + | =Add third number to third columnar register. |
| | • | =Total out accumulator (I=6.00) [Print 6.00]. |
| | C | =Address fourth columnar register. |
| | + | =Add total (6.00) to fourth columnar register. |
| | × | =Condition multiply 6.00×. |
| 4.00 | S | =Enter fourth numeric entry. |
| | +{= | =Complete multiply 6.00×24.00 [Print 24.00]. |
| | ={+ | =Add 24.00 to accumulator (I). |
| | C | =Address fifth columnar register. |
| | + | =Add 24.00 to columnar register. |
| 23.00 | S | =Enter fifth numeric entry. |
| | C | =Address sixth columnar register. |
| | + | =Add entry to columnar register. |
| | II | =Address working register II. |
| | + | =Add entry to working register II. |
| | − | =Subtract entry from accumulator (I=24.00−23.00). |
| | • | =Total out accumulator (I=1.00) [Print 1.00]. |
| | C | =Address seventh columnar register. |
| | + | =Add difference to columnar register. |
| | ÷ | =Condition divide 1.00. |
| | II | =Address working register (II=23.00). |
| | % | =Perform %=function: 1.00+23.00×100=4.35%. |
| | II | =Address working register II. |
| | □ | =Call for no print. |
| | • | =Total II out without print. |
| | CR | =Carrier return to end line program. |

Total Program Entry

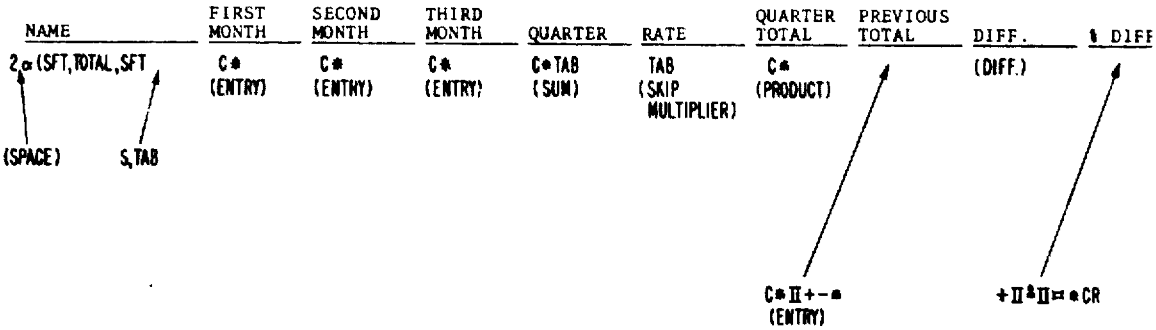

TOTAL PROGRAM

2—Calls for beginning of second subroutine
α→—Start alpha emit
SFT CR TOTAL TAB SFT—Enter desired characters
S—End alpha emit
C—Total out 1st columnar register
•—
C—Total out 2nd columnar register
•—
C—Total out 3rd columnar register
•—
C—Total out 4th columnar register
•—
TAB TAB—Tab past multiplier field
C—Total out 5th columnar register
•—
+—Add to accumulator I
C—Total out 6th columnar register
•—
II—Add contents of 6th columnar register to working
+—□Register II
−—Subtract same from accumulator I
•—Total out accumulator I
÷—Condition divide
II—Address working register II
%—Perform % divide
II—
□—Clear II
•—
CR—End subroutine 2

Program by Example—Load Mode—Line Program Entry

The first action on the part of the operator is to depress Load button 76, FIG. 2, which establishes the Load operation. This automatically causes a carrier return, restoring the print head in printer 12 to the left margin on the form. This also sets up the circuits in the system for the accessing of the first byte location of the user's program storage. Thereafter, the operator now depresses the Alpha character key indicative of an alphabetic entry. The Alpha entry character is stored in the first character location in the user's program area in the memory of the system. It also establishes a mode that enables use of the keyboard and the printer as a normal typewriter. At this point, the operator then types the first name under the name column. She then depresses the Program Start key on the keyboard that restores the mode back to a Load mode. The next key depressed is the Tab key that moves the print head to the first column under "FIRST MONTH."

The operator now enters the data involving the amount "1.00"followed by the Program Start key that initiates printout of the number. Following this, the Plus key is depressed to indicate that this amount is to be added in the primary Accumulator I to amounts in succeeding columns to form a total figure. Also, if the operator desires that the amounts vertically in the columns be accumulated, the Circle C key prior to the Plus key directs the system to take the column figure and add it into the column register related to this column. Prior to initiating operation, the operator selects the input field width by appropriate positioning of switch 7, FIG. 1*a*. This will establish the width of the numbers in the successive columns and the system automatically takes the data entered, places it in the appropriate columns and adjusts it with the proper number of upper digit spaces thereby fitting the number into the column properly and insuring that the number terminates at the right hand margin of the individual column. Thus, assuming an input field width of eight characters and an entry of only two characters, the two digit number will still be at the right hand side of the column involved. Subsequently, the operator enters the various functional characters as indicated and then tabs into the succeeding column for entry of the data related to that column. In the particular case illustrated it is assumed that an input field width of eight characters has been selected. Most of the character positions in the individual columns will be blank spaces, but in each case the dollar amounts are properly positioned in the columns. No tabulation is necessary with the particular form illustrated. That is, the operator need only depress the Program Start button following an entry to start a new entry which is then properly adjusted and winds up at the right hand margin of the column. The system automatically takes into account when each character is entered in a particular field and subtracts each character entry off of the total field width to insure proper location.

Now, in the second column, the operator enters the dollar amount, depresses Program Start which causes printing of the dollar amount and the Plus key which accumulates this amount with the amount previously entered in the first column to carry forward a horizontal total. If a vertical total is desired in the second data column, the operator depresses the Circle C key and then the Plus function key. Depression of the Circle C key automatically initiates addressing of the proper columnar register out of the sixteen columnar registers in the system.

A similar procedure is followed in the third column with the exception that the Total function key is depressed following the Plus key. This automatically takes the total of the figures in the first, second, and third columns and initiates printing of the horizontal total under the "QUARTER" heading. The operator then depresses the Multiply function key since it is known that the quarter total is to be multiplied by a particular rate in the "RATE" column. If the operator wished to save the amounts in the quarter column, the Circle C and the Plus key would be depressed. Following the entry of the Multiply key, the rate of "4.00" is typed under the RATE heading. This is done by means of a shaded overlay portion of the keyboard. Depression of the Program Start button will enable the system to print out the rate under the heading. The next key depressed by the operator in the illustrated case is the Equals Accumulate key that initiates multiplication of the quarter total times the rate and addition of the amount to the primary accumulator I. The Equals Accumulate key serves both an Equals and an Add function. The two separate keys could be depressed individually if desired. Thereupon, the quarter total is printed out and following this the operator enters the total from the previous quarter which in this case is "23.00." The previous quarter total is entered into one of the addressable registers (II) and a comparison is initiated between that and the total for the present quarter to arrive at a difference figure. Following the previous total entry, the Program Start key is depressed and then the roman numeral II key to select the corresponding working register. The 23.00 from the previous total is subtracted from the 24.00 total of the present total upon depression of the Minus key. This then creates the value "1.00"that is printed under the "DIFFERENCE" column when the * key is struck. In the illustrated case it is desired to divide the difference by the previous quarters total to derive a percent difference. To do this the Divide function key is depressed followed by working register II and Percent Equals. This performs the division of the difference by the previous quarter's total held in working register II and prints it out as a true percentage 4.35. The operator can use C, + to save any columnar total desired. Finally the operator pushes working register II, Non-Print, and Total keys to clear working register II. Following this the operator depresses the Carrier Return key to restore the print head to the left hand margin.

Following the entry of the program information and the data as illustrated, the operator could switch over to the Auto mode by depression of the Auto mode keybutton 75, FIG. 2. Most likely, however, the operator will continue on and enter the program required for the "TOTAL" line that is necessary during preparation of the form and that is set forth above immediately following the first line data and program entry illustration.

Program By Example—Load mode—Total Program Entry

As in the previous Load operation for the Line program, the operator now depresses the Load button 76, FIG. 2, in order to establish the proper mode for loading of the program entries required for the "TOTAL" line. Following this, the operator refers to the upper row of keys on the keyboard, FIG. 2, and depresses the number "2" key which indicates to the system that the following information constitutes a subroutine number 2. Later, this enables the operator to select the subroutine for use by a further depression of the numeric key "2." The system searches through the user's program memory looking for the first Carrier Return and initiates operations under control of the routine immediately following such first carrier return. Thus, the location of the beginning of the second subroutine will vary depending upon the length of the first subroutine, the various subroutines following one another in immediate succession in the memory. The number 2 prints out followed by a space that indicated that this is the number 2 subroutine in the program. Following this, the operator depresses the Alpha Emit function key in order to indicate that this is a total line and not just another line item. The shift key is depressed to condition the keyboard into upper case for printing of the description "TOTAL" and then released to shift to lower case. The operator then depresses the Program Start key followed by the Tab key which lines the print head up with the beginning of the first column of data. The operator then, in succession, depresses the Circle C Total key in each of the succeeding columns that is later recognized in the system to print out the columnar totals in the total line whenever it is encountered. Upon printout these registers are cleared. The first three data columns, of course, are indicative of individual monthly entries, while the fourth column is indicative of a quarterly total. The Circle C Total key is depressed in that column as well to effect print out of the quarterly sum. Following this the Tab key moves the printer into the rate column, but another Tab key depression will move the print head onto the quarter total skipping the rate column which is not required in the total line. The total for the present quarter is thereupon printed out followed by the total for the previous quarter that has been accumulated in working register II. The same routine used in the Line program is used at this point to develop a difference figure between the total for the previous quarter and for the present quarter to print difference value under the "DIFFERENCE" column. A percent Difference is also developed in a similar manner. The completion of the entry for the total line is indicated by depression of the Carrier Return button on the keyboard.

Auto Mode

Following the entry of the Line program and the Total program in the system, the operator is now ready for automatic operations and initiates these by depression of the Auto mode button 75, FIG. 2. The data previously entered in the first line data and program entry procedures can be simulated data or from a previous quarter, etc. In such event, the operator now positions a new sheet of paper in the printer with the appropriate headings to start operations. Referring to the completely printed form previously set forth, the form is divided into three portions with the first portion representing fairly normal operations during the Auto mode. The second portion of data shows the possibility of skipping certain columns if no data is required to be entered in them and illustrates some of the tab control procedures. The third portion of the form illustrates the handling of decimal points particularly with respect to the "RATE" column.

Since the system now has the Line program stored in the user's memory, it is only necessary for the operator to enter the first, second, and third names under the "NAME" column along with the corresponding data in the various columns. The system will automatically control the operations to effect the proper addition required to develop quarterly totals, to make the comparison of the present quarterly total and the previous quarterly total in order to derive a difference and to develop a percentage difference figure in each line. Following entry of the first three lines on the form, the operator depresses the number 2 key in the upper row on the keyboard to select the second subroutine for handling of the total line.

When the second portion of the form involving another three names and a total line is reached, the operator has several columns that require no entry. During the original entry of information, that is, during the learning procedures described, a Circle C character is stored in the User's program area each time the system is to look for a numeric entry of the type shown under the various columns for the monthly figures. If instead, the operator depresses the Tab key to tabulate over a particular column the system will maintain synchronism between the physical location of the print head on the form and the columnar registers by ignoring the numeric entry indications associated with that particular column by making use of the tabulation function to step the columnar addressing so that the proper columnar register is accessed. Thus, in contrast with prior systems, the operator need not space over each of the individual columns.

Decimal Point Portion

The third portion of the form illustrated indicates the handling of decimal points that are located in different places in the rate amounts. The control of the decimal point location is normally controlled by appropriate movement of a selector knob 9, FIG. 1*a*. The system operates with a floating decimal point input, but a fixed decimal point output as determined by the control panel setting. This prevails during multiplication or division operations, but not for additions within individual columns since the decimal point should be located similarly for all amounts entered in any selected column.

Magnetic Card Extensions

The present system contemplates the provision of Magnetic Card recording/reproducing apparatus such as that described in the Kolpek case for automatic entry and output of data and program information into the system. Thus, it is intended that if a magnetic card apparatus is connected with the system, the various program routines can be stored on magnetic cards and automatically entered into the system for use by the operator rather than going through the manual entry procedures just described. Also, the document headings can be stored on magnetic cards for automatic print out on each of the individual forms. In addition, data required during operation, such as the previous quarterly totals, etc., can be stored on magnetic cards and automatically provided to the system when needed.

Flow Charts and Logic

Figure 4A:
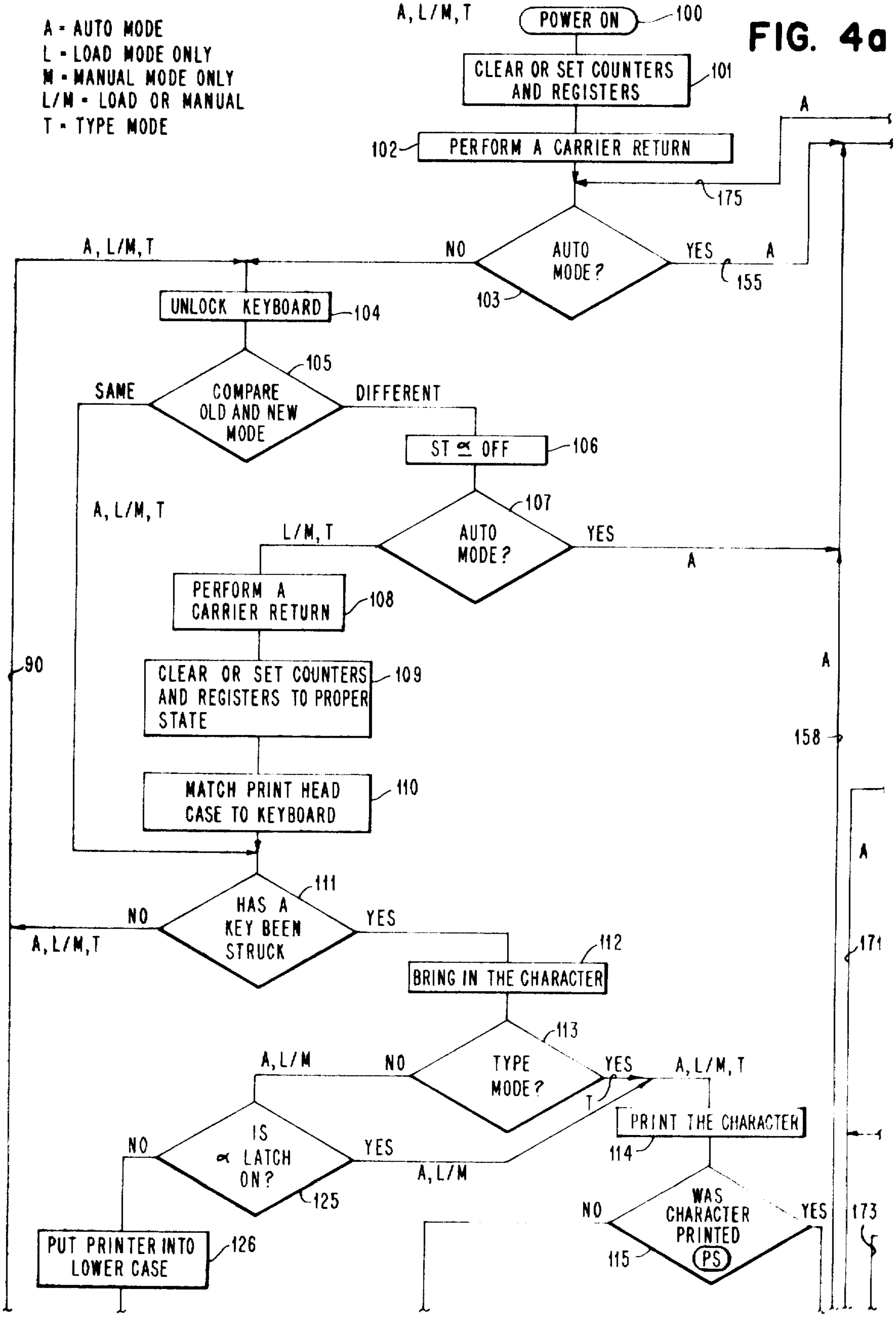
FIGS. 4*a*, 4*b*, 4*c*, 4*d*, and 4*e* when arranged as shown in FIG. 5 (on same sheet as FIG. 4*e*) illustrates data and logic determination operable to perform the various functions in the system of FIG. 1.
Figure 4B:
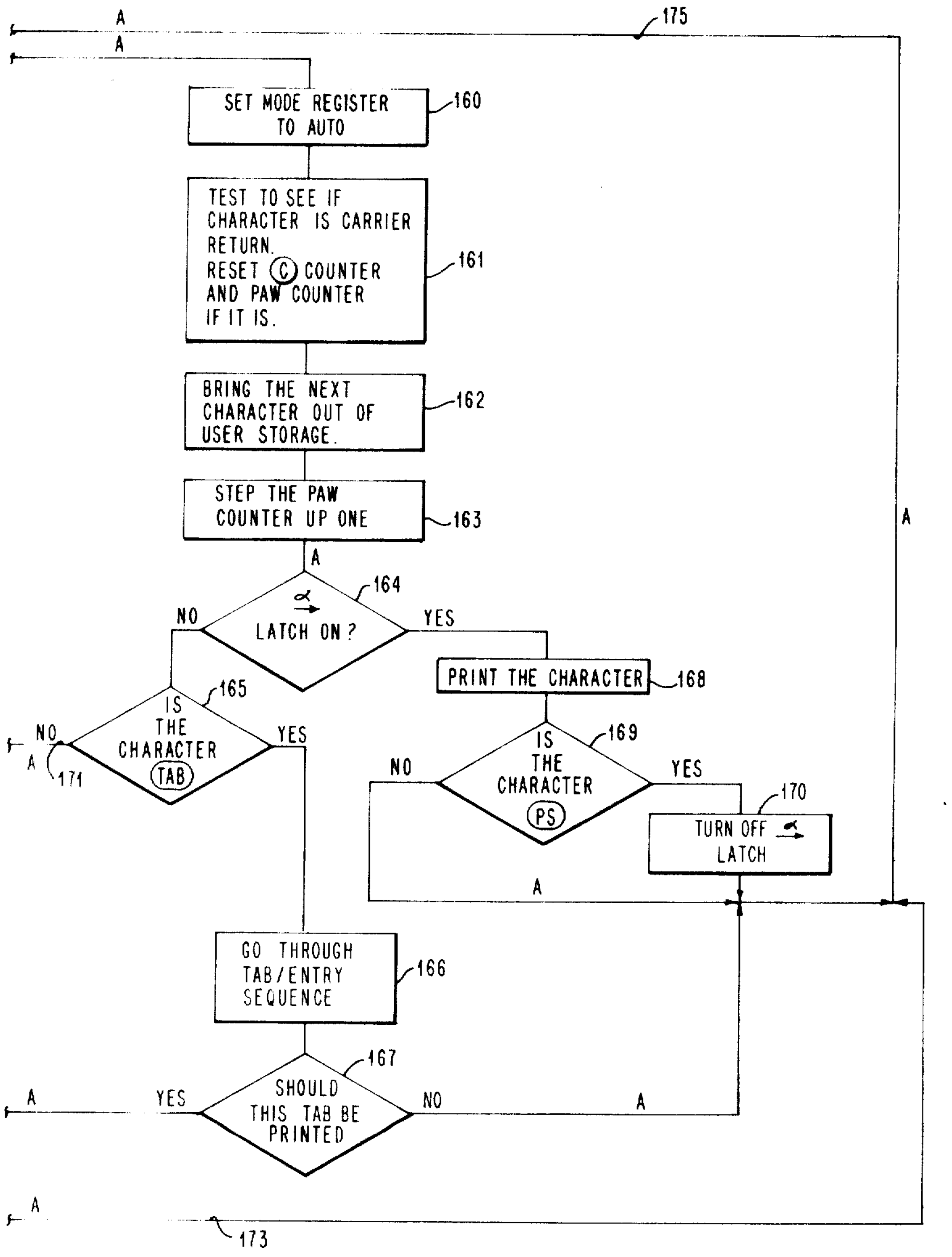
Figure 4C:
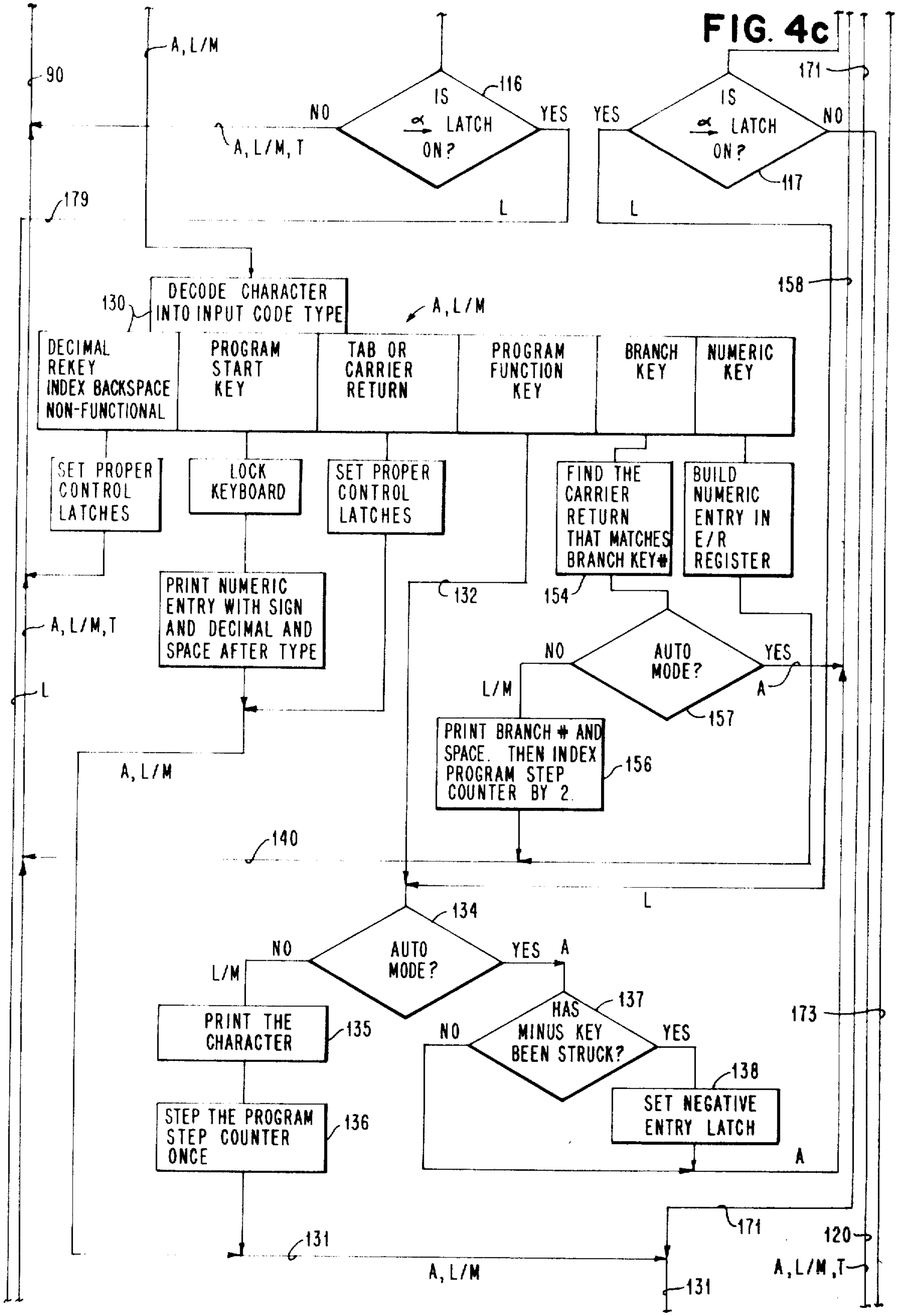
Figure 4D:
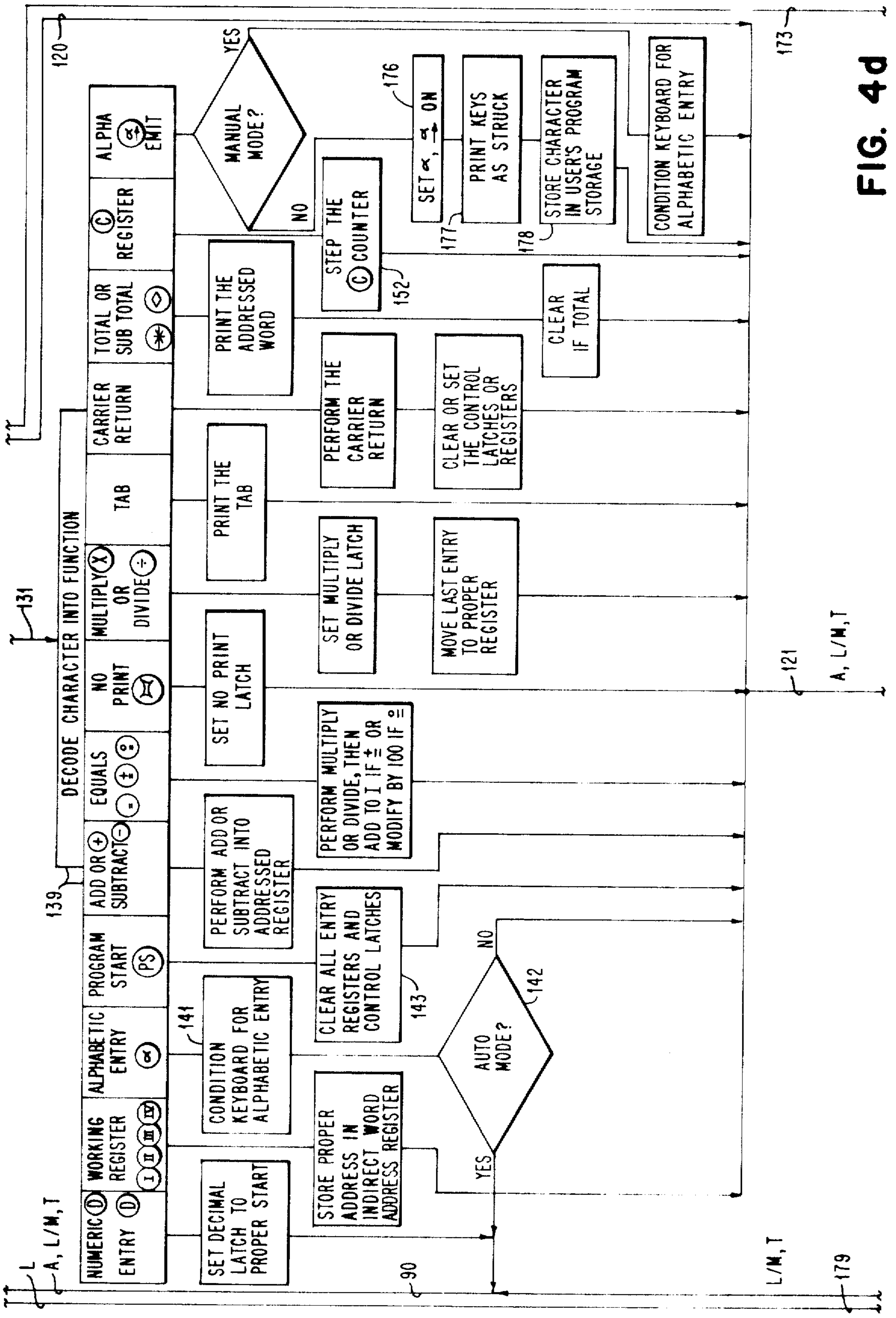
Figures 4E, 5:
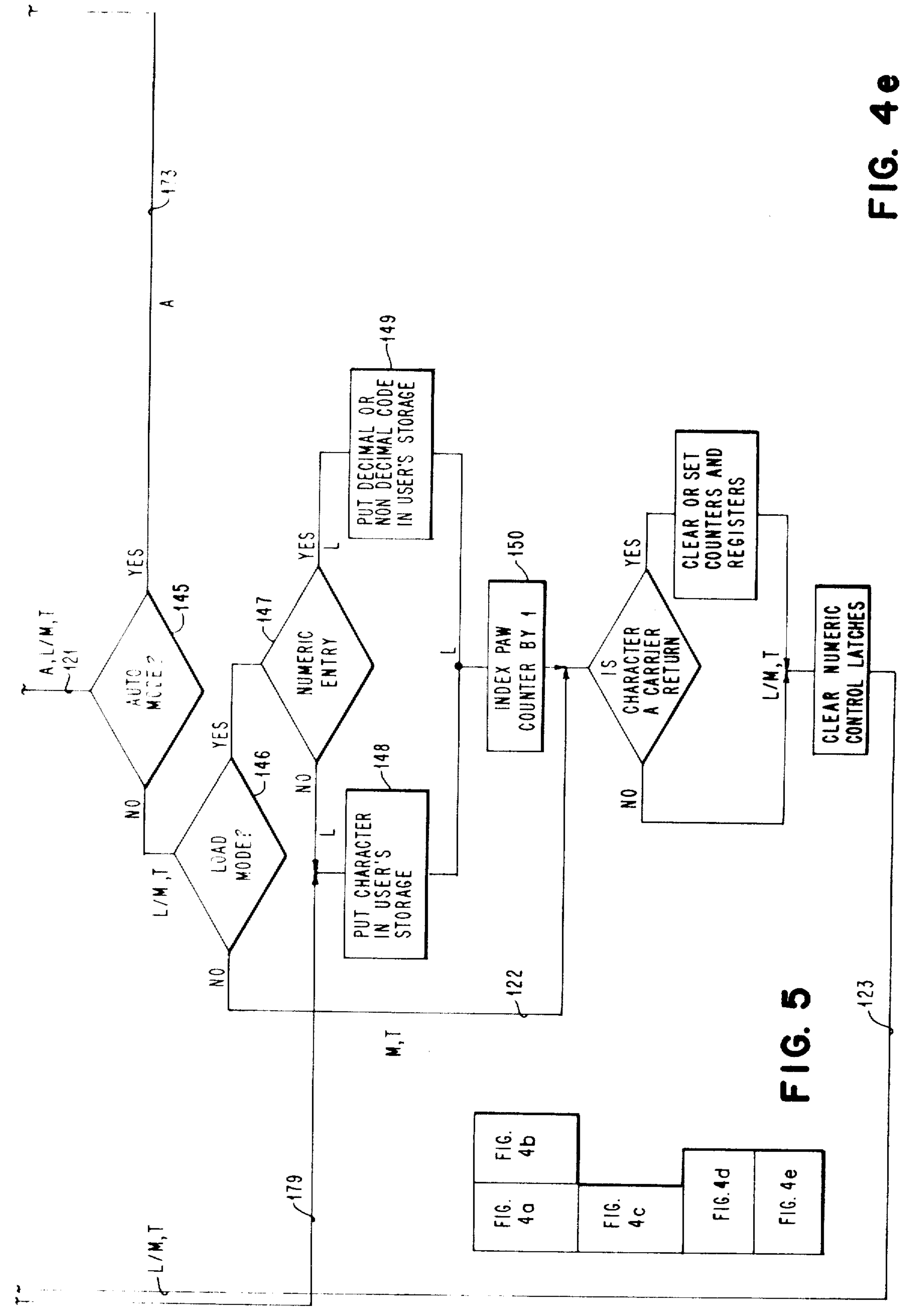
Figure 6A:
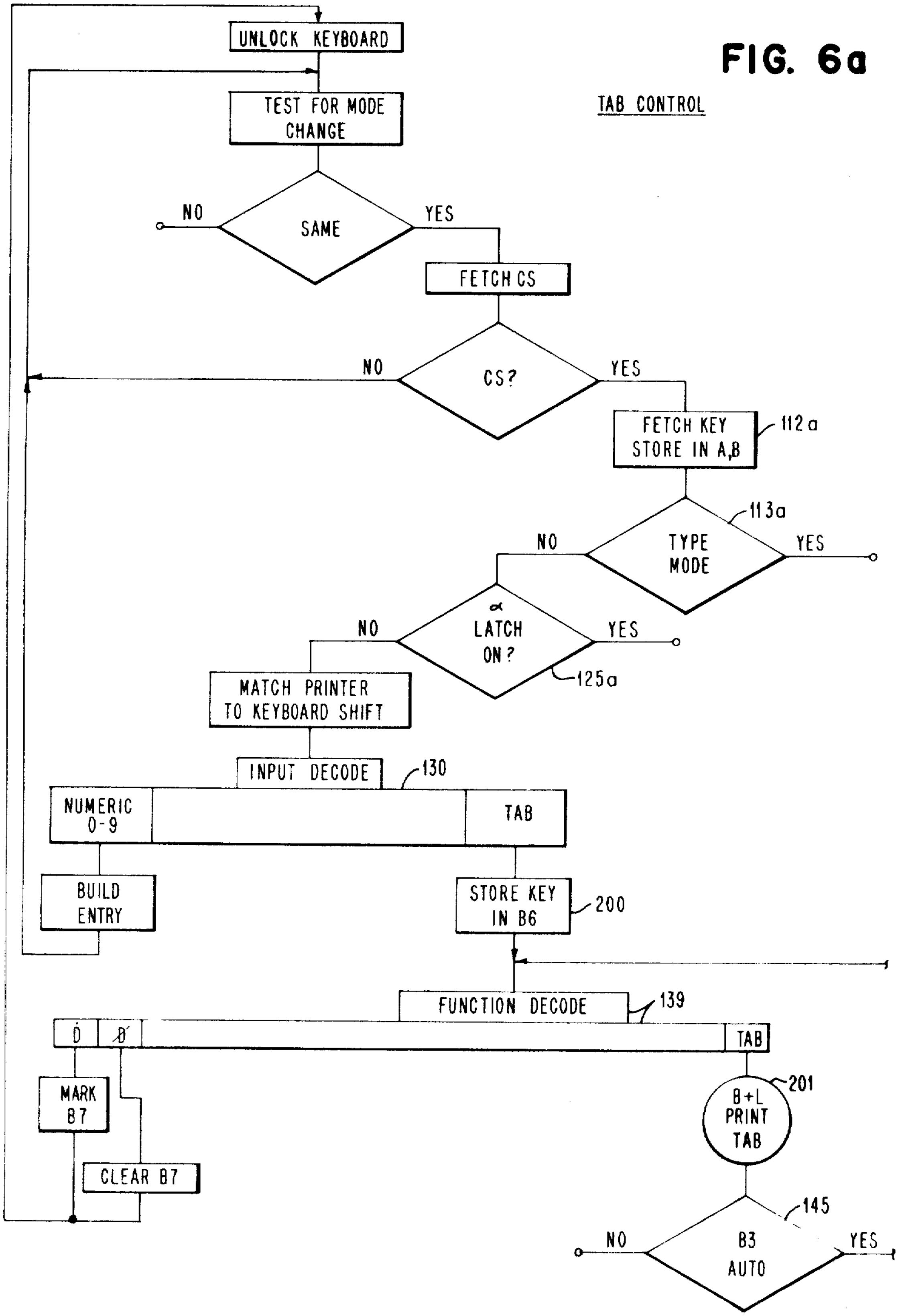
FIGS. 6*a* and 6*b*, when arranged as shown in FIG. 7, illustrate decisions and internal operations performed during tab control procedures particularly with respect to the skipping of columns on a form.
Figures 6B, 7:
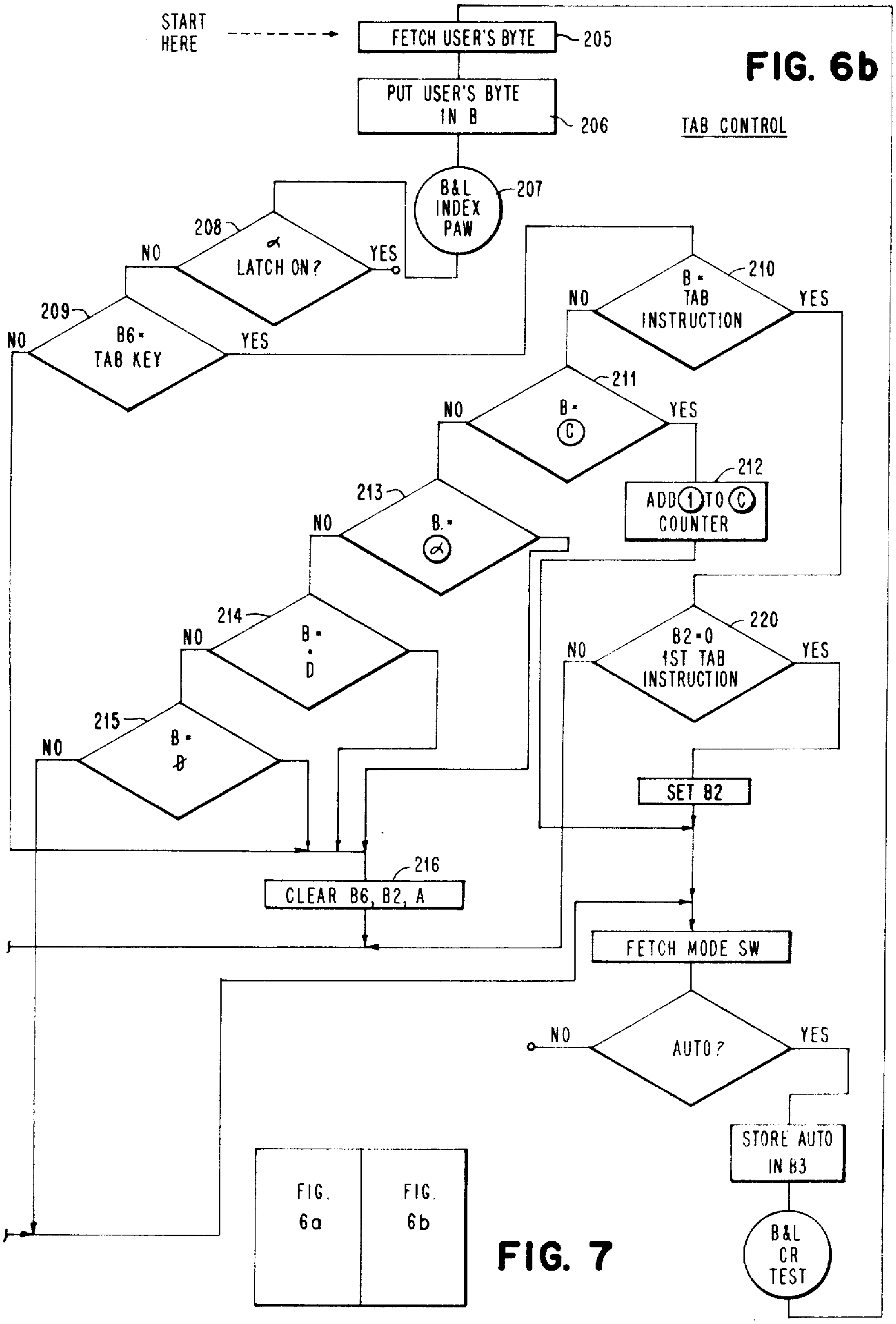
Figure 8:
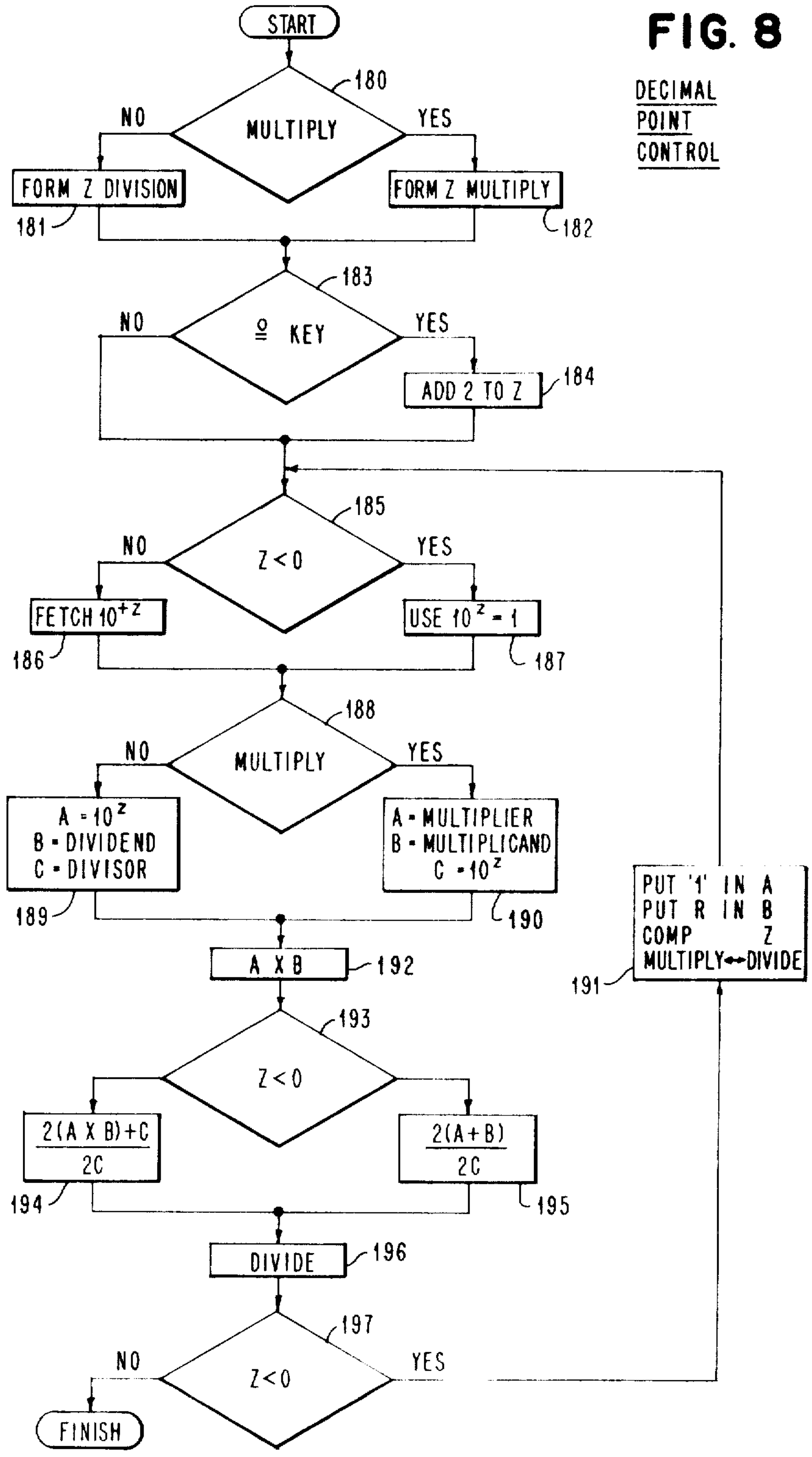
FIG. 8 illustrates procedures in the system of FIG. 1 involved during multiply and divide operations with appropriate decimal point control.

Reference is made to various flow charts particularly those shown in FIG. 4*a*–4*e* that should be arranged as indicated in FIG. 5 representing an overall system data flow and logic diagram, as well as FIGS. 6*a* and 6*b* arranged as shown in FIG. 7 representing the tabulation details, and FIG. 8 representing the handling of the decimal point. The system logic is discussed in connection with the various modes of the system including the Type mode, the Load mode, the Manual mode, and the Auto mode as well as emphasis on the specific features including the handling of the Columnar Registers, Branching, Percent Equals, Alpha Emit, all of the foregoing being discussed in connection with FIGS. 4*a*–4*e*and Tab control outlined in FIGS. 4*b*, 6*a*, and 6*b*, as well as decimal point, outlined in FIG. 8. Several conventions are employed in the flow charts. As shown in the upper left corner of FIG. 4*a*, the various modes established by depression of appropriate buttons on the keyboard in FIG. 2 are symbolized by related alphabetic symbols that are then placed adjacent the paths and logic blocks in the various flow chart figures. Thus, a line having the symbols A, L/M, and T is followed for the Auto mode, the Load or Manual mode, and the Type mode. A line having only the symbol A is followed only by the Auto mode. As another example, a line having the designation L is used only in the Load mode.

Type Mode

The first mode discussed is the Type mode during which characters are entered by the keyboard in FIG. 2 and pass through the electronics of the system directly out to the printer. Essentially, this mode corresponds to a normal typing mode. All modes start with the Power On block 100 at the top of FIG. 4*a* simply indicating that the system has been turned on and is ready for the operator. With the turn on of power, the various counters and registers in the system are cleared or set as the case may be, block 101. Also, a Carrier Return is performed by block 102 to return the print head on the printer 12, FIG. 1, to the left margin. Since the system is assumed to be in the Type mode as a result of depression of button 78, FIG. 2, the logic block 104 unlocks the keyboard for entry of characters. Comparison circuit 105 is provided in the system to determine whether or not the present mode is the same or different from the mode in which the system was previously. As an example, if the system had just gone from the Auto mode to the Type mode, the Alpha Emit latch would be turned off, block 106, and a Carrier Return performed. Modes can be changed any time. Any time that a switch in modes occurs, block 108 initiates a Carrier Return of the printer, except when the system is placed in the Auto mode. Also, some of the counters, such as the Circle C counter and the branching counter, are cleared out by block 109 in preparation for succeeding operations. The system further includes circuits, block 110, for comparing and matching the shift status of the print head to the keyboard shift status. These operations are performed any time that a mode change occurs.

A determination is then made as to whether a key has been struck on the keyboard, and if not, the loop continues simply up to the Unlock keyboard block 104, FIG. 4*a*, to look for mode changes. As soon as a key has been depressed on the keyboard, block 111 brings the character into the system through keyboard control logic 2, FIG. 1, to Byte Register A by block 112. With the system now in the Type mode, block 113, the character corresponding to the depressed key is immediately printed. If the character printed is not a Program Start character, that is, it is all other characters, then the loop continues through block 116 determining whether the Alpha Emit latch is on at the top center of FIG. 4*c* and then proceeds into the usual loop back to the Unlock keyboard block 104, FIG. 4*a*. If the Program Start character is encountered, the routine proceeds from block 115, FIG. 4*a*, through block 117, FIG. 4*c*, and by line 120, FIGS. 4*c* and 4*d*, lines 121, 122, and 123, FIG 4 *e*, to the same return loop and eventually to the Unlock Keyboard block 104 in FIG. 4*a*. This continues so long as the system remains in the Type mode of operation with the system waiting for character entry, printing the character, and waiting for the next character.

Load Mode

The Load mode is established by depression of the Load button 76, FIG. 2. The routine in FIGS. 4*a*–4*e* is very similar in the Load mode to the Type mode at the outset. That is, the logic starts with the Power On block 100, proceeds through blocks 101–105 to determine whether the mode is the same or different from the previous mode as was done in the Type mode. The system awaits the entry of a character and follows the loop through block 111 and by line 90 back to block 104 in FIG. 4*a*. Upon entry of a character, the character is brought in, block 112, and at block 113 the Branching is different for the Load mode than it was for the Type mode. In the Type mode, the character was immediately printed and the system returned to the standby loop by line 90. However, in the Load mode as well as the Manual and Auto modes to be discussed, the characters coming into the system are categorized and decoded into particular character types in the decode matrix 130, FIG. 4*c*. This follows determination of whether the Alpha latch is on at block 125, FIG. 4*a*.

Referring to FIG. 4*c*, the decode matrix 130 determines which of six different categories the incoming character should be classified in. The categories are evident by inspection of FIG. 4*c*. Depending upon what category the character is classified in, the system will then proceed through the associated latches and logic shown in FIG. 4*c* to control the system. As an example, nonfunctional keys simply reset the control latches or set the control latches and the system returns to await the entry of additional characters.

Detection of the Program Start key locks the keyboard, initiates printing of the numeric entry, the sign, the decimal, and the proper setting and proceeds by line 131 to make further determinations of the significance of the incoming characters. In the case of the program start character in FIG. 4*d*, all entry registers and control latches are cleared before exiting by lines 121, 122, and 123 in FIG. 4*e* to return to the beginning of the loop by line 90.

Recognition of the Tab or Carrier Return function codes sets various control latches in the system and proceeds through the loop to FIG. 4*d* where recognition of the Tab code results in a tab operation while recognition of the Carrier Return code results in performance of the Carrier Return operation and the clearing or setting of control latches and registers upon return to the left-hand margin.

Recognition of a program function key proceeds by line 132 and various logic including blocks 134–138. Since the system is presently in the Load mode, the loop initiates printing of the character and stepping of the program step counter once through block 136.

Again in FIG. 4c, when the Branch key in the upper row of keys on the keyboard in FIG. 2 is depressed the system will locate the Carrier Return in the User's storage that matches the particular branch key depressed, and since the system is presently in a Load mode will print the branch number followed by a space and index the program step counter by two returning to the loop by line 90.

Lastly, any numeric key initiates circuit action in the system for developing a numeric entry in the Entry/Result register and return by line 140 and line 90 to the initial loop.

An additional difference of the Load mode from the other modes is shown in FIG. 4e where it is indicated that the various entries are placed in User's storage through the logic in blocks 145–149 with appropriate indexing of the program address word counter by an increment of "one," block 150.

Manual Mode

The Manual mode is very similar to the Load mode in about every respect, with the exception that no loading of characters into the User's program storage area of memory takes place in the Manual mode. This is observable by reference to FIG. 4e in particular where the Manual mode exits from block 146 by line 122 to return by the lines 123 and 90, the loop previously discussed.

The Manual mode differs from the Type mode in that functions are performed in the system under control of the category decode matrix 130 in FIG. 4c and the specific decode matrix 139 in FIG. 4d. This enables the operator of the system to use the system essentially as a manual calculator.

Auto Mode

As with the modes previously discussed, the Auto Mode begins with block 100 in FIG. 4a, but instead moves from block 103 by line 155 to various logic in FIG. 4b to fetch the program characters from memory in order to operate the system. The logic involves blocks 160–170 in FIG. 4b. The mode register is set to the Auto Mode at block 160 and following this a test is made each and every cycle to determine if the Carrier Return code has been encountered which would indicate the end of the particular program in User's storage. If a Carrier Return code is encountered, the Circle C counter is reset as well as the program address word counter which keeps track of which of the 128 User's bytes is being worked with. If the character is not a Carrier Return character, then the next character is brought out of User's storage at block 162 and the program address word counter is stepped by one. Other logic involves the testing of the Alpha Emit latch at block 164 which, if it is on, controls the system to print the character at block 168. A Tab character causes a tabulation operation. The program Start character turns off the Alpha Emit latch at block 170. Other characters encountered are determined by line 171, FIGS. 4b, 4a, and 4c and line 131, FIGS. 4c and 4d, for decoding purposes to initiate the particular function required. The exit for the Auto Mode is from block 145 in FIG. 4e and line 173 to return to the loop including line 175 in FIGS. 4b and 4a.

Program By Example

The ability of the system to "learn" the necessary programs and routines was previously described in the sections concerning Load Mode and Auto Mode. However, to recapitulate, reference is again made to FIG. 4a in particular and to the sample job, particularly the Line program. Depression of the Load Mode button on the keyboard establishes the necessary circuit connections for loading the program characters into the User's program area. A Carrier Return operation is automatically initiated and performed in the case of the Line program, the first character entered is the Alpha character. The system has been in a standby status through the circuit loop involving blocks 104–111 and line 90 in FIG. 4a. When the Alpha key is depressed, the character is brought in through block 112 and it is assumed that the Alpha latch 125 is not on at this time. In this case, the circuits represented by block 126, FIG. 4a, become effective to place the printer in the lower case. The category decode matrix 130, FIG. 4c, determines what kind of character is entered. In this case, it is a program function key that is recognized by line 132. Block 134 determines that the system is not in the Auto Mode so the Alpha character is printed under control of block 135. A program step counter is stepped once under control of block 136. In this manner, the first character is stored in the first location of User's storage. The circuits now pass to the major character decode section 139, FIG. 4d, where the third small block in the decode matrix 139 is rendered effective thereby conditioning the keyboard for an alphabetic entry under control of block 141. The exit is from Auto mode block 142 and by lines 121, 123 and 90. While in the Auto mode, the system actuates the printer somewhat as in the Type mode until the Program Start key is depressed, in which case it is decoded through the matrices 130 and 131 to clear all entry registers and control latches under control of block 143. This restores the system to the Auto Mode.

Columnar Registers and Circle C Control

Reference is again made to FIGS. 6b and 4a—4e for consideration of the recognition of columns of data and particularly the control exerted by the Circle C key on the keyboard. While in the Load Mode, the system is assumed to be in the standby loop in FIG. 4a. If the Alpha latch is on, an incoming character is simply printed under control of block 114. In this case, it is assumed that the Alpha latch is not on and the printer is conditioned to a lower case condition by block 126. The Circle C character, being an input code, is categorized by matrix 130, FIG. 4c, and since the system is not in the Auto Mode, the character "C" is printed on the page indicative of the location of the column involved. Also, the program counter is stepped by block 136. Continuing, in FIG. 4d through matrix 139, detection of the Circle C character activates block 152 to step the Circle C counter. In this manner, each time the operator depresses the Circle C key, the Circle C counter is stepped also maintaining a one-for-one relationship between up to 16 columns across the page and the Circle C counter. The Circle C counter is then used to access one of 16 registers that store a running total for each of the related 16 columns across the page. This eliminates the necessity for manipulating a few registers that have to serve for a great number of columns. Further, it eliminates the necessity for splitting somewhat larger registers in order to have available sufficient storage space for the vertical running totals. It also eliminates the need to keep up with the addresses of sixteen different registers.

Branching Procedures

When the operator desires to enter a subroutine for branching purposes such as the "Total" routine noted in connection with the sample job, this is done in the Load mode by depression of one of the keys in the upper row on the keyboard, FIG. 2. The system is in a standby mode in FIG. 4a, but recognizes that a key has been struck by block 111. The character, as an example, the number "2," is brought in under control of block 112 and, assuming the Alpha latch is off, renders circuit 126 effective to direct the character to the category matrix 130. This matrix activates block 154 and since Auto mode is not on at this time, further activates block 156 to print the branch number "2" on the page, to space the printer, and to index the program step counter by two. Prior to this action, the system is at the stored program area storing the Carrier Return that corresponds to this particular branch number, as checked by block 154.

Later, when in the Auto Mode, the operator again depresses the branch code "2." Ordinarily, the system is waiting for the operator to enter significant data through the shaded area of the keyboard, FIG. 2. However, if the branch key is depressed, the system receives it, passes it through the decode matrix 130, FIG. 4c, and again activates circuits controlled by block 154 to search the program storage area for the Carrier Return code that corresponds to the branch key number that was depressed. This time, however, the number is not printed since the machine exits through block 157 and line 158 in FIGS. 4c and 4*a* eventually to proceed through the Auto mode actions set forth in FIG. 4*b*.

In this manner, the system compares the branch key number with the Carrier Return codes stored in the User's program area in order to locate the corresponding subroutine that is required at this time. Upon locating the required subroutine, with the circuit blocks represented in FIG. 4*b*, the exit is usually by line 171 through FIGS. 4*b*, 4*a*, 4*c* and by line 131 in FIGS. 4*c* and 4*d* to determine the proper system action required by the decode matrix 139 in FIG. 4*d*.

Decimal Point Control

In most small electronic calculators, the method of controlling significance and corresponding decimal point placement constitutes an important consideration. This is true regardless of whether the machine is used for accounting, scientific, or statistical applications. For example, some systems perform integer arithmetic with "Column Shift Round-Off" and corresponding "Punctuation" being controlled by a limited-programming method. Another system, taught in the McDonald et al., patent, offers a flexible-programming method which forces the programmer to solve the problem each time a calculation is performed. Some desk calculators offer fixed-point arithmetic; that is, a lever or switch automatically inserts the decimal at a predetermined position and all calculations are carried out to the same number of decimal positions. (Generally, significance is lost by an unrounded result). Other machines offer a form of "floating-point" arithmetic allowing the entry of the decimal point in a limited number of positions with the calculations performed according to the usual rules of arithmetic.

The "floating-point" method offers move flexibility of input factors. However, if the output is a printed document, the output format and corresponding calculation's significance are dictated by the requirements of the application. Also, proper round-off is usually essential.

In the present system, the input decimal is controlled from the input media such as a keyboard or magnetic card. The output decimal and calculation significance are controlled by appropriate programming media such as the manual rotary switch 9, FIG. 12. Each factor is stored internally as an integer with its proper characteristic; that is, the number of decimal digits assumed to be to the right of the decimal point. Calculations are then performed by integer arithmetic with the proper adjustments for significance. FIG. 8 with control blocks 180–197 illustrates the implementation.

Multiply

Although the column-shift, round-off operation may be implemented in many ways, the result of the operation may be expressed as follows:

$$R=\frac{(M_P\times M_C)+\frac{10^Z}{2}}{10^Z}$$

Where:

$R$ = Result to be printed $M_p$ = Multiplier $M_C$ = Multiplicand $Z$ = Number of decimal digits to be dropped Z can be computed very easily from the known parameters:

Let $D_A$ = Sum of digits to the right of the decimal in $M_p$ and $M_C$.

$D_{SW}$ = Number of digits to the right of the decimal desired in the result as specified by switch 9.

Then for multiplication:

$Z=D_A-D_{SW}$

Divide

In division, it is often necessary to first "left shift" the dividend to allow the desired accuracy of the quotient. One means to round-off the quotient is by first adding one-half of the divisor to the dividend. This may be expressed as:

$$R=\frac{(D_D\times 10^Z)+\frac{D_V}{2}}{D_V}$$

Where:

$R$ = Result to be printed $D_D$ = Dividend $D_V$ = Divisor $Z$ = Number of decimal digits to left shift the dividend to allow proper accuracy and decimal placement Z is computed for division as:

$Z=D_{SW}-D_A$

Where:

$D_{SW}$ = Same as Multiply above $D_A$ = Arithmetic decimal (Dividend decimal minus Divisor decimal)

Implementation

It follows from the above that both multiplication and division use the same general formula:

$$R=\frac{(A\times B+\frac{C}{2}}{C}$$

In Multiply:

$A=Mp$ $B=M_C$ $C=10^Z$

In Divide:

$A=D_D$ $B=10^Z$ $C=D_V$

It can also be seen from the above analysis that the factor Z for multiplication is the negative of the factor Z for division. Therefore, there is no significant difference in the two operations, and the same hardware can be used for both.

For ease of implementation, the general formula above is written as:

$$R=\frac{2(A\times B)+C}{2C}$$

The procedure for solution is then:

1. Compute Z (change sign if Divide is programmed).
2. Fetch $10^Z$ by a table look-up means.
3. Arrange factors in registers designated $A$, $B$ and $C$.
4. Solve formula.
5. Set "decimal byte" in result to $D_{SW}$.

Further details of implementation could take on many forms. In the preferred arrangement, a serial binary calculator is used with the input-output conversions being similar to those disclosed in the McDonald et al. U.S. Pat. No. 3,297,992. The multiplication and division processes used in the formula are also similar. The multiply by two required in the numerator is accomplished by one additional iteration of the multiply sequence. This results in one additional binary left shift to effect the multiply by two. Factor $10^Z$ is obtained from the fixed-factor memory 37, FIG. 1. Control and sequencing of the formula solution are by conventional-sequential-logic techniques.

Referring to FIG. 8, a few arithmetic examples will demonstrate the problem and the method of solution.

Example I

Multiply 1.234 by 2.12 with the decimal switch 9, FIG. 1*a*, set at 2. (That is, common dollar and cents punctuation is desired in the answer).

Compute $D_A$ as $3+2=5$

That is, three-place decimal plus two-place decimal.

Compute $Z$ as $D_A-D_{SW}$ $Z=5-2=3$

Locate factors as binary integers (written here as decimal integers) in Registers A and B:

$A=1234$ $B=212$

Fetch $10^Z$ from memory table and store in Register C:

$C=10^3=1{,}000$

Solve equation and drop remainder as $$R=\frac{2AB+C}{2C}=\frac{2(1234\times 212)\times 1000}{2\times 1000}=262$$

Insert decimal in printout under control of Switch 9.

Print 2.62

Example II

Divide 12.4 by 6.54 with Switch 9 = 2

$D_A = 1 - 2 = -1$ $Z = D_{SW} - D_A = 2 - (-1) = 3$ $A = 124$ $B = 10^3 = 1{,}000$ $C = 654$ $$R = \frac{2(124 \times 1000) = 654}{2 \times 654} = 190 \text{ (Remainder dropped)}$$

Print as 1.90

Next, consider the problem of negative values of Z. A simple example will illustrate.

Multiply 12 times 12 with $D_{SW} = 2$ (The desired answer is obviously 144.00)

$D_A = 0 + 0 = 0$ $Z = D_A - D_{SW} = 0 - 2 = -2$

Then $10^Z = 10^{-2} = 0.01$

Although it is possible to solve the equation by rules of arithmetic, it is not convenient for the system to do so. The multiply/divided hardware operates only in integer arithmetic. Therefore, the factor 0.01 has no meaning. To solve the problem, first consider the multiply equation with Z written as a negative quantity:

$$R = \frac{(M_P \times M_C) = 10^{-Z}}{2 \times 10^{-Z}}$$

Multiplying numerator and denominator by $10^Z$ yields:

$$R = \frac{2(M_P \times M_C) \times 10^Z + 1}{2}$$

This can be solved by the machine, but becomes a difficult special case. Instead, the problem is solved in two parts:

Part One a. Set $Z = 0$ b. Omit the addition step from the numerator

This step yields:

$$R^1 = \frac{2(M_P \times M_C) + 0}{2}$$

$R^1 = M_P \times M_C$ and can be found by the same hardware used for multiplication problem.

Part Two a. Use $Z = Z$ (complement original $Z$)

b. Divide $R^1$ by 1

Remember the divide equation:

$$R = \frac{2(D_D \times 10^Z) + D_V}{2D_V}$$

$$R = \frac{2(R^1 \times 10^Z) + 1}{2}$$

Returning to the example: Multiply 12 × 12 with $D_{SW} = 2$

*Part One*

$$R^1 = \frac{2(12 \times 12 + 0}{2} = 144$$

*Part Two*

$$R = \frac{2(144 \times 10^2) - 1}{2} = 14400$$

Print as 144.00

The same two-step process can be used for negative values of Z in a divide problem.

Per Cent Equals

The present system initiates simplified-percentage calculations by the Percent Equals key on the keyboard. Depression of this key causes the factor two to be added to Z. Analysis of the formula shows that this results in either the multiplication or division by 100 as required. This is also illustrated in FIG. 8, particularly involving blocks 183 and 184.

Percent Equals Example

Multiply 2.62 by 2.5%. Same $D_{SW}$.

$D_A = 2 + 1 = 3$

"% Key" adds 2 to $Z$ $Z = (3-2) + 2 = 3$ $A = 262$ $B = 25$ $C = 10^3 = 1{,}000$ $$R = \frac{2(262 \times 25) + 1000}{2 \times 1000} = 7 \text{ (Remainder dropped)}$$

Print as .07

Alpha Emit

Reference is again made to FIGS. 4a–4e for consideration of the Alpha Emit operations. In the Load Mode, when the operator depresses the Alpha Emit keybutton on the keyboard, FIG. 2, it is brought into the system under control of block 112, FIG. 4a. In the Load Mode, the character is printed under control of block 135 and the program step counter is stepped once under control of block 136, FIG. 4c. This is as a result of the determination that this is a program function key through blocks 125, 126, Decode Matrix 130, and block 134. In addition, the Alpha Emit character is recognized by decode matrix 139 and circuits are activated under control of blocks 176, 177 and 178 that set the Alpha latch and Alpha Emit latch on, cause printing of the characters as the keys are struck, and store each character in the User's program storage for later use in the Auto Mode. Thus, following the entry of the Alpha Emit character, with the Alpha latch now on a determination is made by block 125, FIG. 4a, that the character should be printed and this is done under control of block 114. Since the character is assumed not to be a Program Start character, an exit exists through blocks 115, 116 and by line 179 in FIGS. 4c, 4d and 4e directly to block 148 to load the character into the User's portion of the memory for subsequent recognition during the Auto Mode.

In the Auto Mode, circuit 164, FIG. 4b, recognizes that the Alpha Emit latch is on and directs printing of the character under control of blocks 168 and 169. Upon recognition of the Program Start character, the Alpha Emit latch is turned off by block 170.

Tabulation Control

Some indication was made previously in connection with FIG. 4b that the system makes provision for maintaining synchronism between the Circle C counter and the columns of data physically located on the form under normal conditions where each and every column is used, as well as in those cases as illustrated in the second portion of the sample form when the operator decides to skip certain columns. The block that controls the tabulation sequence is designated as 166 in FIG. 4b. A related block is 167. The control logic for accomplishing this purpose is illustrated in much greater detail in FIGS. 6a and 6b. Entry of the line program involves at each column the entry of a Circle C character indicative that a particular columnar register is to be accessed for the entry of related data. This continues in succession across the form as up to 16 columns and the related 16 registers are encountered. Thus, the Circle C character gives some indication that a column is now in proximity to the print head on the form and that the columnar register is accessed for an entry. In the normal case, where the operator actually enters data, the individual numbers of the data are accumulated in byte register A and upon detection of the Program Start character, the particular number is printed out with the proper spacing so that the next column on the form is in position for a subsequent entry.

When, however, the operator determines that no data is to be entered into a particular column as in the case of the "-SECOND MONTH" column in the intermediate portion of the illustrated form, the Tab key is depressed instead in order to skip over the column and position the print head in proximity to the following column. Reference is now made to FIGS. 6a and 6b that illustrate the system determinations when the operator decides to skip a particular column meanwhile maintaining the proper synchronism between the physical columnar location on the form and the status of the Circle C counter. In the upper left portion of FIG. 6a any character coming into the system is recognized by block 112a. Blocks 113a and 125a serve functions similar to the corresponding blocks 113 and 125 in FIG. 4a. The input decode matrix 130 determines that a Tab character has in fact been entered in the system and stores the character configuration in register B6 under control of block 200. In addition, the Tab code is decoded by matrix 139 to effect performance of the tabulation. This is done under control of block 201. Auto block 145 serves a function similar to that in FIG. 4e routing the Tab (or any function logic) to the Auto routines in FIG. 4b, but for the present case, the details involving the Tab code are particularly shown in FIG. 6b that is a further expansion of the block 166 in FIG. 4b.

The tabulation control sequence begins at block 205 where the next character in the User's storage is brought from memory and placed in register B under control of block 206. Also, the Program Address Word counter is indexed by block 207. It is assumed that the Alpha latch is not on at the present time as determined by block 208. The logic is then routed to block 209 that determines if register B6 is storing a Tab code representation. The output of block 209 proceeds to block 210 which checks the code configuration of the User's byte presently in register B as previously entered under control of block 206 and determines whether it is a Tab instruction. If it is determined, in fact, that the next character in the User's byte location, register B, is a Circle C character as determined by block 211, then block 212 controls the system's circuits to add a count of one to the Circle C counter thereby stepping the Circle C counter up to the next count position which actually reflects the physical location of the print head in relation to the form. Various other determinations are made by blocks 213, 214 and 215, any one of which will result in the clearing of the registers B6, B2 and A under control of block 216. Accordingly, register B6 will not be storing the Tab code configuration as additional User's bytes are accessed. The system continues to operate bringing additional User's bytes from memory into register B under control of block 206 until the next Circle C character is encountered at which time the system stops and waits for the next character entry by the operator. Any Tab codes encountered in User's memory are recognized and acted upon, except the first one which is skipped under control of block 220 with a "yes" output. The reason for this is that the first Tab in the field has been performed under control of the key depressed by the operator, but the other tab codes should be recognized in User's storage in order to insure that the print head will reach the proper location on the form.

While the invention has been particularly shown and described with reference to a preferred embodiment, it will be understood by those skilled in the art that various changes in form and detail may be made without departure from the spirit and scope of the invention.

What is claimed is:

1. An accounting system for processing data in connection with an accounting form having data arranged in a plurality of columns, comprising:

means for establishing a printing mode in said system during which data is printed on said form;

a printer, said printer having printing means, means for retaining said form in position for printing of data on said form during operations, and means operable during said printing mode for relatively moving said form and said printing means in order to position individual columnar locations on said form for printing by said printing means;

a plurality of register means for storing data, said register means corresponding in number to the number of columnar locations on said form, and each of said register means being associated with a particular one of said columnar locations;

accessing means for addressing said register means for entry or exit of data therein; counter means having a plurality of count conditions corresponding to said columnar locations and operable during relative movement between said printing means and said form in said printing mode to condition said accessing means to access the associated register means as each column on said form is encountered;

Columnar Total keys for initiating printing of totals;

means for storing signal codes representative of said Columnar Total keys for each column on said form;

means for sensing said Columnar Total signal code representations;

and means responsive to sensed Columnar Total signal representations for printing out the contents of said columnar registers as said columns are encountered and for concurrently resetting said columnar registers.

2. An accounting system for processing data in connection with an accounting form having data arranged in a plurality of columns, comprising:

means for establishing a printing mode in said system during which data is printed on said form;

a printer, said printer having printing means, means for retaining said form in position for printing of data on said form during operations, and means operable during said printing mode for relatively moving said form and said printing means in order to position individual columnar locations on said form for printing by said printing means;

a plurality of register means for storing data, said register means corresponding in number to the number of columnar locations on said form, and each of said register means being associated with a particular one of said columnar locations;

accessing means for addressing said register means for entry or exit of data therein; counter means having a plurality of count conditions corresponding to said columnar locations and operable during relative movement between said printing means and said form in said printing mode to condition said accessing means to access the associated register means as each column on said form is encountered;

a Tab key in said printer for initiating tabulation operations;

tabulation means in said printer responsive to depression of said Tab key to perform a tabulation operation in order to skip from any column location on said form to another column location;

and control means also responsive to depression of said Tab key to step said counter means to a count status that accurately reflects the column location on said form to which said printer is tabulated.

3. An accounting system, comprising:

keyboard means having facilities for generating data signals, printer operation signals, system operation signals, program control signals, and special condition signals;

a printer having printing means, means to retain an accounting form in position for printing of data, means for performing printer operations, and means for relatively moving said form and said printing means in order to position individual columnar locations on said form for printing by said printing means; arithmetic means in said system for processing data representative of arithmetic factors to provide desired arithmetic results;

memory means for storing codes representative of said data signals, said printer operation signals, said system operation signals, said program control signals, and said special condition signals;

mode control means incorporating a plurality of mode indicating means selectively settable under operator control and respectively designated "Type," "Manual," "Load," and "Auto;"

means operable responsive to setting of said "Type" indicating means to interconnect said keyboard and said printer to operate said printer to print characters and to perform printer operations directly in response to operation of said keyboard;

means operable responsive to setting of said "Manual" indicating means to interconnect said keyboard, printer, memory, and arithmetic means and to condition said system for entry of data from said keyboard and storage in said memory, processing of said data by said arithmetic facilities, and printing of arithmetic results and performance of printer functions by said printer;

means operable responsive to setting of said "Load" indicating means to store signals from said keyboard as program code representations in said memory in a desired sequence for later use;

means operable responsive to setting of said "Auto" indicating means to access program code representations previously stored during said Load mode for automatically controlling said system during subsequent data entry, processing, and printing operations;

an Equals key on said keyboard for initiating a preconditioned multiply or divide operation;

means responsive to depression of said Equals key to actuate said arithmetic facilities in order to multiply or divide two factors and develop a result for printing on said form;

an Equals Accumulate key for initiating a preconditioned multiply or divide operation and transfer of a result to a selected area in said memory;

means responsive to depression of said Equals Accumulate key to actuate said arithmetic facilities as when said Equals Accumulate key is depressed and further to transfer said developed result to said selected area in said memory;

a Percent Equals key for initiating dividing of a result by 100;

and means responsive to depression of said Percent Equals key for actuating said arithmetic facilities as when said Equals key is depressed with the additional development of dividing said result by 100 in order to provide a final result indicative of the percentage one factor bears to another.

4. An accounting system for processing data in connection with an accounting form having data arranged in a plurality of columns, comprising:

means for establishing a printing mode in said system during which data is printed on said form;

a printer, said printer having printing means, means for retaining said form in position for printing of data on said form during operations, and means operably during said printing mode for relatively moving said form and said printing means in order to position individual columnar locations on said form for printing by said printing means;

a plurality of register means for storing data, said register means corresponding in number to the number of columnar locations on said form, and each of said register means being associated with a particular one of said columnar locations;

accessing means for addressing said register means for entry or exit of data therein; counter means having plurality of count conditions corresponding to said columnar locations and operable during relative movement between said printing means and said form in said printing mode to condition said accessing means to access the associated register means as each column on said form is encountered;

a keyboard for entry of data into said system, said keyboard having a special column key for depression by an operator to indicate movement from one column to the next on said form;

stepping means controlled by said special column key in said printing mode for stepping said column counter to a count condition representative of said one column to a count condition representative of said next column in order to condition said accessing means to access the register means for said next column;

a Tabulation key on said keyboard operable when depressed to tabulate said printer in order to skip over a selected column and wherein said stepping means is responsive to depression of said Tabulation key to step said columnar counter;

means to read and dump information in said memory associated with the column skipped; and means for deconditioning said system for numeric entry until the next column in sequence is encountered.

* * * * *